United States Patent
Koyano

(10) Patent No.: US 9,930,259 B2
(45) Date of Patent: Mar. 27, 2018

(54) CAMERA SYSTEM WITH IMAGE BLUR CORRECTION, BLUR CORRECTION METHOD THEREFOR, AND CAMERA BODY WITH IMAGE BLUR CORRECTION

(71) Applicant: OLYMPUS CORPORATION, Hachioji-shi, Tokyo (JP)

(72) Inventor: Kento Koyano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/181,869

(22) Filed: Jun. 14, 2016

(65) Prior Publication Data

US 2017/0019600 A1 Jan. 19, 2017

(30) Foreign Application Priority Data

Jul. 13, 2015 (JP) .................................. 2015-140029

(51) Int. Cl.
*H04N 5/232* (2006.01)
*G03B 17/14* (2006.01)
*G02B 27/64* (2006.01)

(52) U.S. Cl.
CPC ....... *H04N 5/23287* (2013.01); *G02B 27/646* (2013.01); *G03B 17/14* (2013.01); *H04N 5/23209* (2013.01); *H04N 5/23258* (2013.01); *G03B 2205/0007* (2013.01)

(58) Field of Classification Search
None
See application file for complete search history.

(56) References Cited

U.S. PATENT DOCUMENTS

| | | | | |
|---|---|---|---|---|
| 2005/0140793 A1* | 6/2005 | Kojima | .............. | H04N 5/23287 348/208.99 |
| 2015/0264266 A1* | 9/2015 | Katsuyama | .......... | G02B 27/646 348/208.2 |
| 2015/0271410 A1* | 9/2015 | Shintani | ............. | H04N 5/23264 348/208.4 |
| 2015/0281581 A1* | 10/2015 | Sakurai | .............. | H04N 5/23287 348/208.2 |
| 2015/0281582 A1* | 10/2015 | Sakurai | .............. | H04N 5/23287 348/208.2 |

(Continued)

FOREIGN PATENT DOCUMENTS

JP 07-104338 A 4/1995

*Primary Examiner* — Justin P Misleh
(74) *Attorney, Agent, or Firm* — Volpe and Koenig, P.C.

(57) ABSTRACT

A camera system including an interchangeable lens and a camera body, in which the camera body includes: a Roll blur correction range setting unit that sets a blur correction range in Roll directions of the camera body to be θ1 when the interchangeable lens mounted on the camera body cannot perform blur correction (in the Pitch directions and the Yaw directions) or that sets the range to be θ2 (≥θ1) when the interchangeable lens can perform blur correction; a Pitch-Yaw blur correction range setting unit that sets blur correction ranges in the Pitch and Yaw directions of the camera on the basis of the set blur correction range in the Roll direction; and a blur correction ratio calculation unit that calculates a blur correction ratio of each of the interchangeable lens and the camera body when both of them perform blur correction.

7 Claims, 32 Drawing Sheets

(56) References Cited

U.S. PATENT DOCUMENTS

2016/0173781 A1* 6/2016 Tsuchiya ............ H04N 5/23258
                                                         348/208.7
2016/0261806 A1* 9/2016 Honjo ................ H04N 5/23209
2016/0330377 A1* 11/2016 Tsuchiya ............ H04N 5/23209
2016/0330378 A1* 11/2016 Tsuchiya ................ G03B 17/14

* cited by examiner

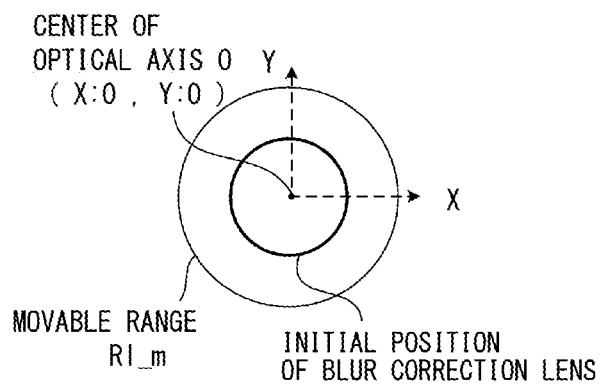
F I G. 4 A

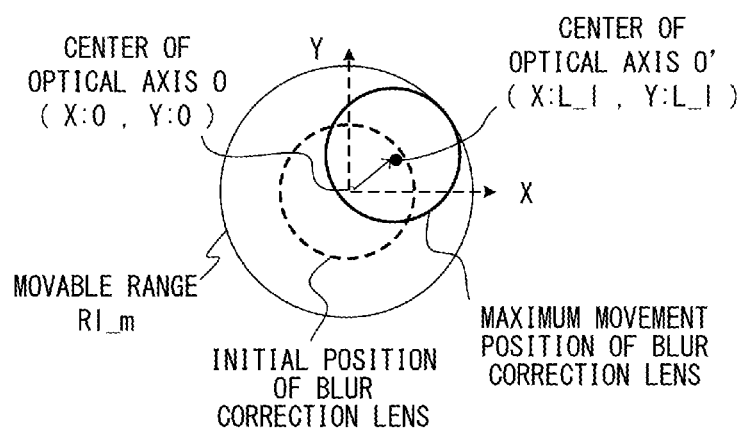
F I G. 4B

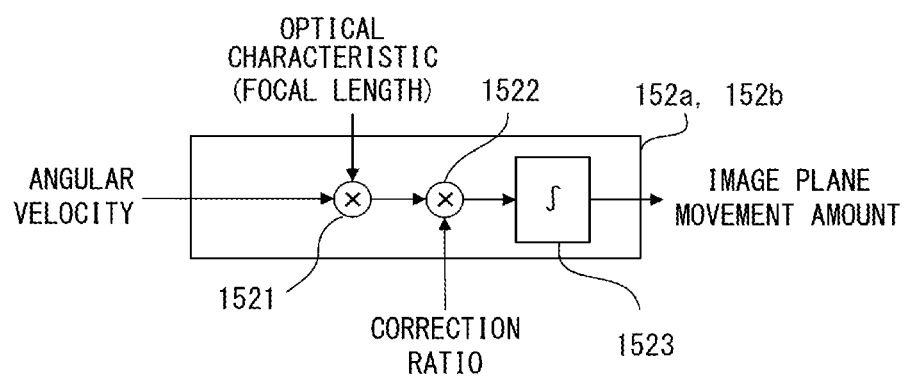
F I G. 6 A

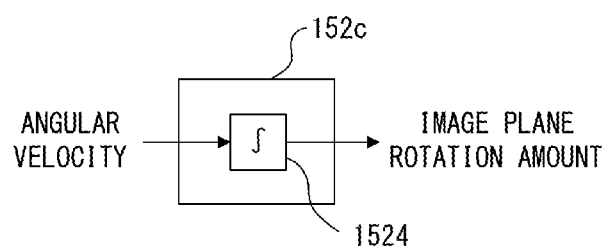
F I G. 6 B

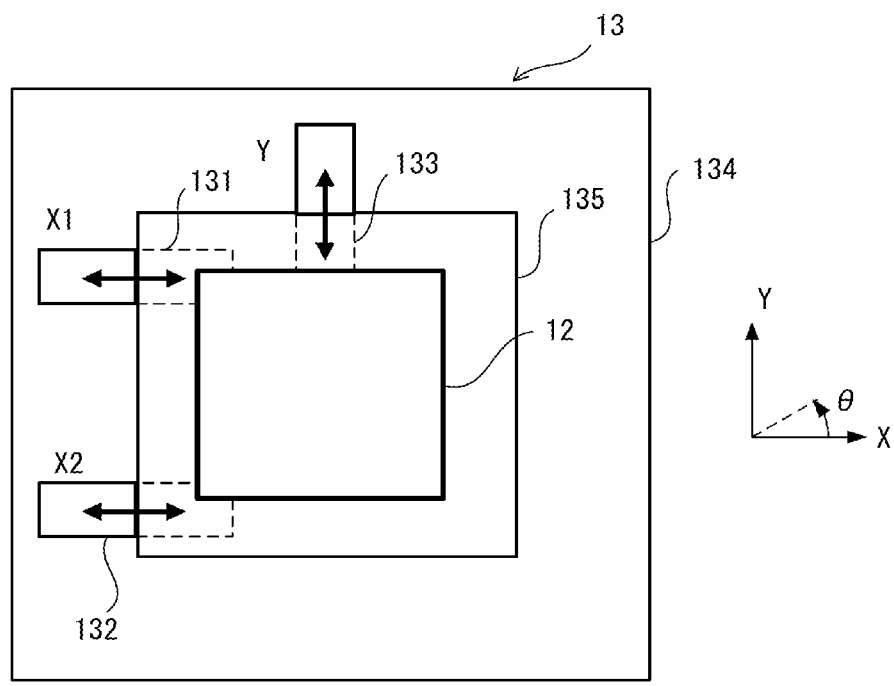
F I G. 9

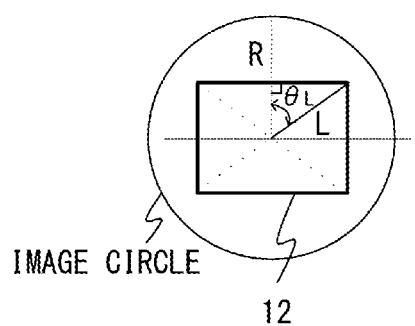
F I G. 10A

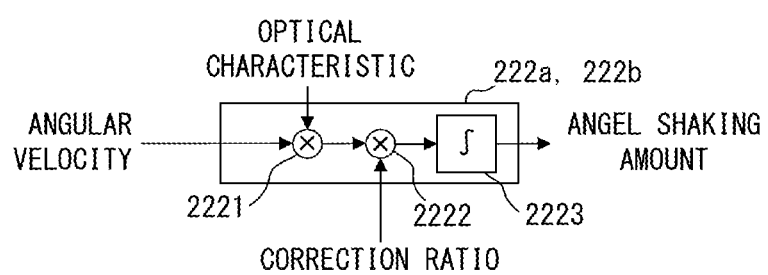
F I G. 13

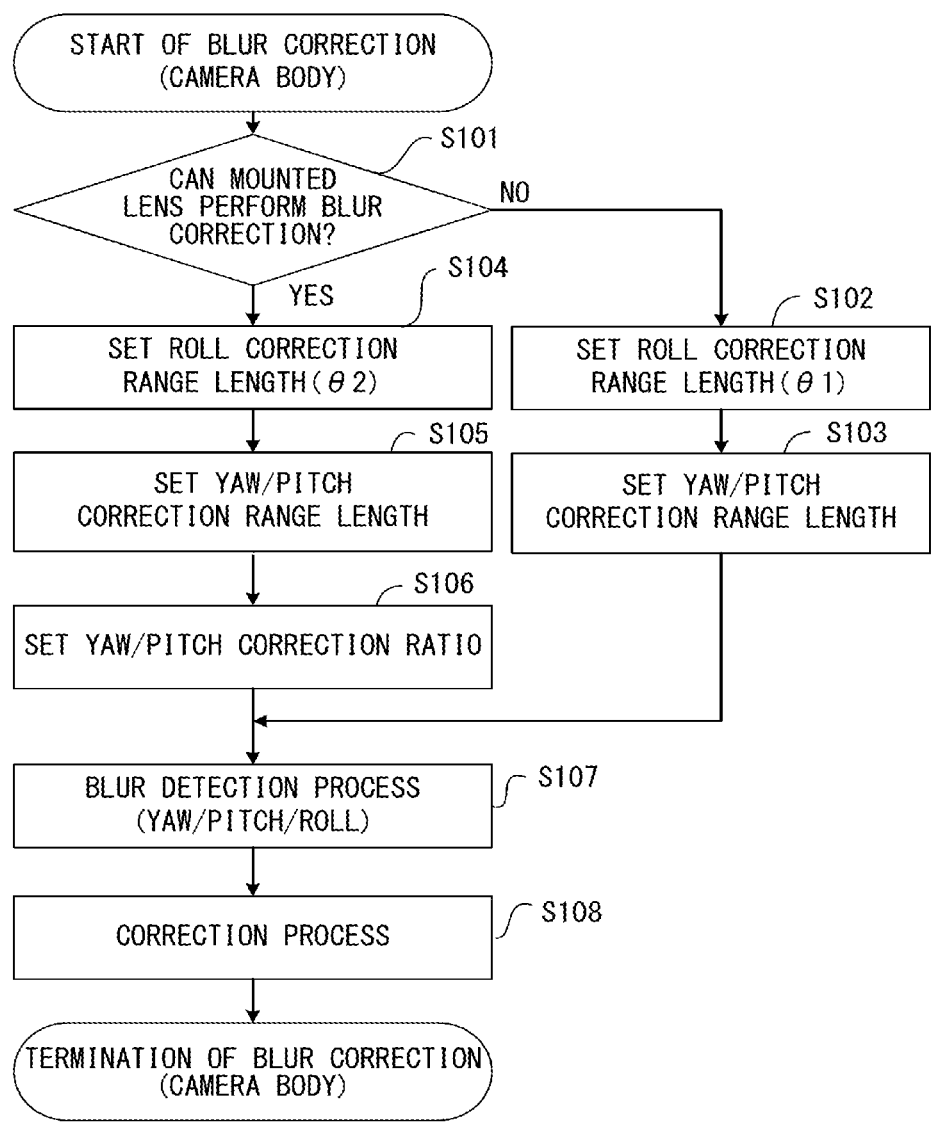
F I G. 1 4

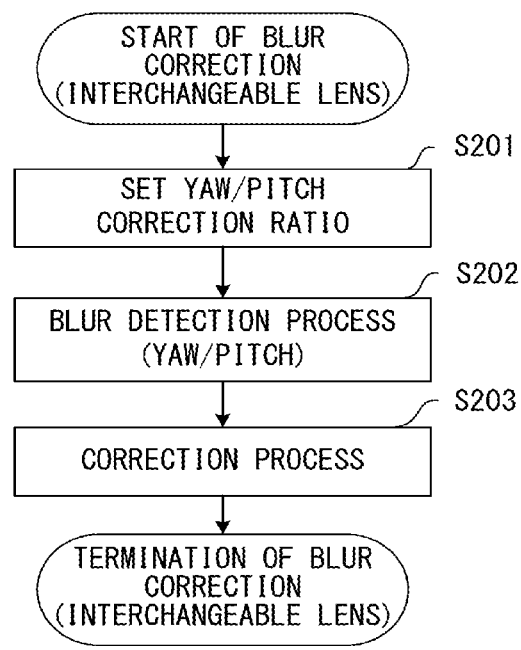
F I G. 1 5

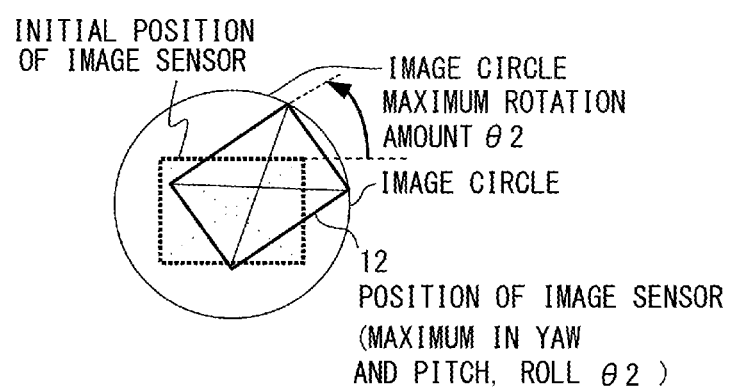
F I G. 1 6 B

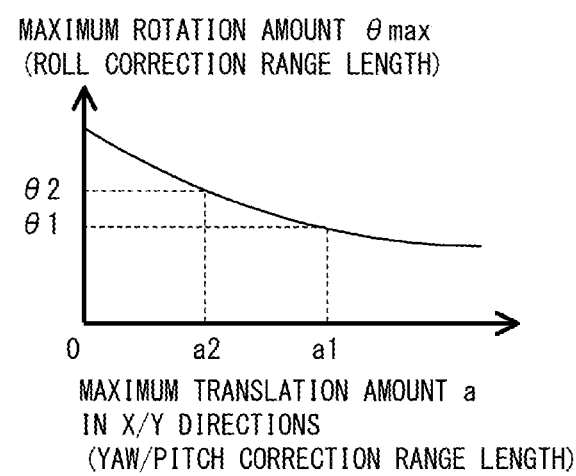
F I G. 1 7

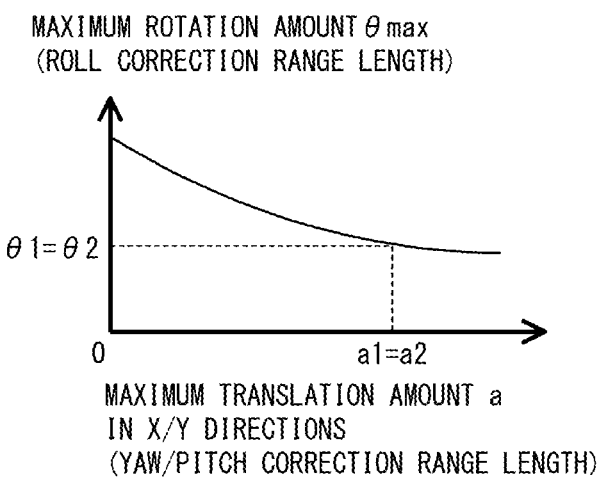
F I G. 2 1

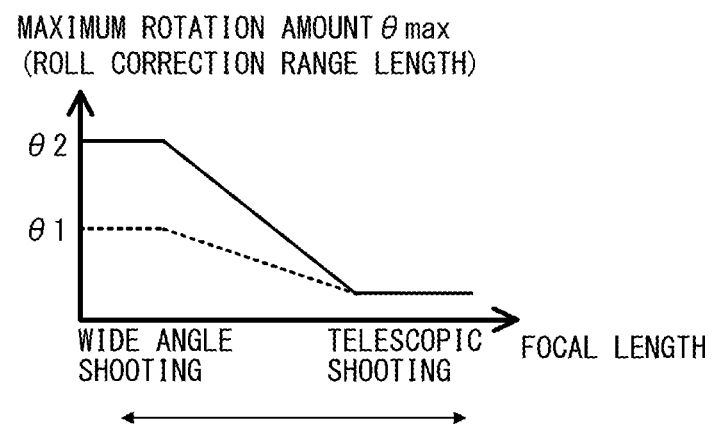
F I G. 2 2 A

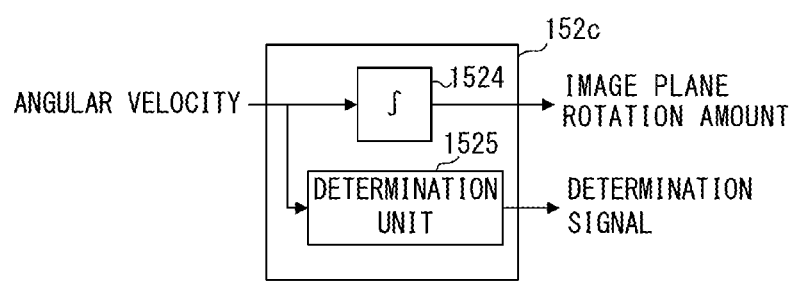
F I G. 2 4

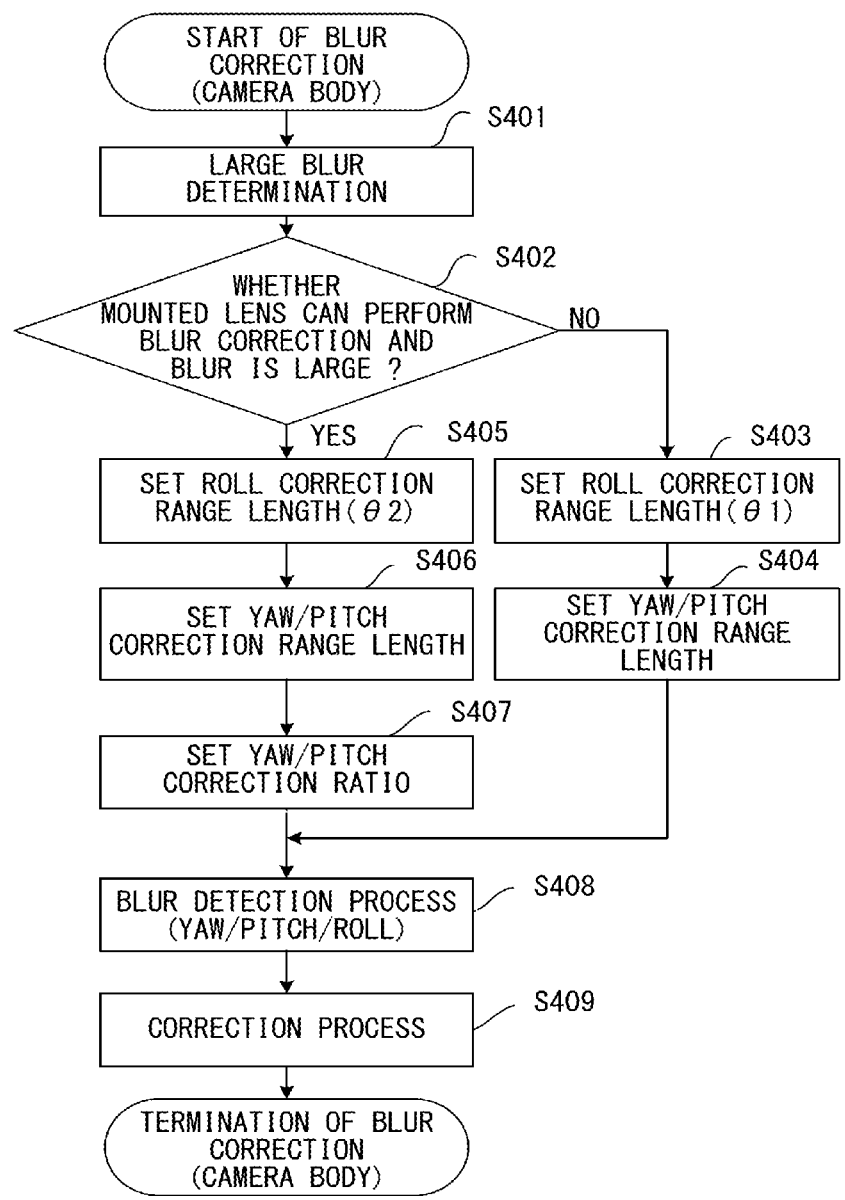
F I G. 2 7

CAMERA SYSTEM WITH IMAGE BLUR CORRECTION, BLUR CORRECTION METHOD THEREFOR, AND CAMERA BODY WITH IMAGE BLUR CORRECTION

CROSS-REFERENCE TO RELATED APPLICATIONS

This application is based upon and claims the benefit of priority of the prior Japanese Patent Application No. 2015-140029, filed Jul. 13, 2015, the entire contents of which are incorporated herein by reference.

FIELD

The present invention relates to a camera system, provided with an image blur correction mechanism for correcting image degradation occurring due to an image blur caused by camera shaking, that includes an interchangeable lens and a camera body, and to a blur correction method therefor.

BACKGROUND

In recent years, cameras with a camera shake correction function have become widespread, making it possible to shoot excellent images without image blur even without paying particular attention to it during handheld image shooting.

Some cameras are of an interchangeable-lens type, which allows interchanging between image-shooting lenses in accordance with the purpose of the image shooting. In such a camera system, the camera shake correction function above is in some cases provided to interchangeable lenses or the camera body.

When an interchangeable lens is provided with a camera shake correction function, the interchangeable lens is provided with a sensor for detecting shaking so as to move part of the image-shooting lens group in a direction of cancelling the detected shaking on the plane perpendicular to the optical axis, and thereby blur is corrected.

When the camera body is provided with a camera shake correction function, the camera body is provided with a sensor for detecting shaking so as to move the image sensor in a direction of cancelling the detected shaking, and thereby blur is corrected.

Which of the interchangeable lenses and the camera body is to be provided with a camera shake correction function depends upon individual camera systems or camera manufacturers because each approach has its own advantages and disadvantages. Recently, in some cases, both the interchangeable lenses and the camera body of a camera system have been provided with a camera shake correction function in a common camera system so that the system is used by combining these functions.

Patent Document 1 (Japanese Laid-open Patent Publication No. 7-104338) discloses a technique of operating only one of two connected devices that are provided with a blur correction function or operating both of them at a prescribed ratio.

SUMMARY

An aspect of the present invention is a camera system including an interchangeable lens and a camera body to and from which the interchangeable lens is attachable and detachable, wherein the camera body includes:

a blur correction unit that performs blur correction in a plurality of rotation directions including Roll directions, which are directions of rotation on an optical axis of the interchangeable lens mounted on the camera body, Pitch directions, which are directions of rotation on an axis perpendicular to the optical axis, and Yaw directions, which are directions of rotation on an axis perpendicular to both the optical axis and the axis perpendicular to the optical axis;

a determination unit that determines whether or not the interchangeable lens mounted on the camera body can perform blur correction in the Pitch directions and blur correction in the Yaw directions;

a Roll blur correction range setting unit that sets a blur correction range in the Roll directions to be a first blur correction range for the blur correction unit performing blur correction in the Roll directions when the determination unit determines that the interchangeable lens mounted on the camera body cannot perform blur correction in the Pitch directions and blur correction in the Yaw directions or that sets a blur correction range in the Roll directions to be a second blur correction range, which is equal to or longer than the first blur correction range, for the blur correction unit performing blur correction in the Roll directions when the determination unit determines that the interchangeable lens mounted on the camera body can perform blur correction in the Pitch directions and blur correction in the Yaw directions;

a Pitch-Yaw blur correction range setting unit that sets blur correction ranges in the Pitch and Yaw directions for the blur correction unit performing blur correction in the Pitch directions and blur correction in the Yaw directions, on the basis of the first or second blur correction range set by the Roll blur correction range setting unit; and a blur correction ratio calculation unit that calculates a camera-body-side blur correction ratio and an interchangeable-lens-side blur correction ratio for both the camera body and the interchangeable lens performing blur correction in the Pitch directions and blur correction in the Yaw directions when the determination unit determines that the interchangeable lens mounted on the camera body can perform the blur correction in the Pitch directions and blur correction in the Yaw directions, and the blur correction unit performs blur correction in the Roll directions within the second blur correction range set by the Roll blur correction range setting unit when the determination unit determines that the interchangeable lens mounted on the camera body can perform blur correction in the Pitch directions and blur correction in the Yaw directions, and performs blur correction in the Pitch directions and blur correction in the Yaw directions within the blur correction ranges in the Pitch and Yaw directions set by the Pitch-Yaw blur correction range setting unit on the basis of the second blur correction range in accordance with the camera-body-side blur correction ratio calculated by the blur correction ratio calculation unit, and the interchangeable lens performs blur correction in the Pitch directions and blur correction in the Yaw directions in accordance with the interchangeable-lens-side blur correction ratio calculated by the blur correction ratio calculation unit.

Another aspect of the present invention is a blur correction method for a camera system including an interchangeable lens and a camera body to and from which the interchangeable lens is attachable and detachable, wherein the camera body includes a blur correction unit that performs blur correction in a plurality of rotation directions including Roll directions, which are directions of rotation on an optical axis of the interchangeable lens mounted on the camera body, Pitch directions, which are directions of rotation on an axis perpendicular to the optical axis, and Yaw directions, which are directions of rotation on an axis perpendicular to both the optical axis and the axis perpendicular to the optical axis, the blur correction method including:

determining whether or not the interchangeable lens mounted on the camera body can perform blur correction in the Pitch directions and blur correction in the Yaw directions;

setting a blur correction range in the Roll directions to be a first blur correction range for the blur correction unit performing blur correction in the Roll directions when it is determined that the interchangeable lens mounted on the camera body cannot perform blur correction in the Pitch directions and blur correction in the Yaw directions or setting a blur correction range in the Roll directions to be a second blur correction range, which is equal to or longer than the first blur correction range, for the blur correction unit performing blur correction in the Roll directions when it is determined that the interchangeable lens mounted on the camera body can perform blur correction in the Pitch directions and blur correction in the Yaw directions;

setting blur correction ranges in the Pitch and Yaw directions for the blur correction unit performing blur correction in the Pitch directions and blur correction in the Yaw directions, on the basis of the first or second blur correction range;

calculating a camera-body-side blur correction ratio and a interchangeable-lens-side blur correction ratio for both the camera body and the interchangeable lens performing blur correction in the Pitch directions and blur correction in the Yaw directions when it is determined that the interchangeable lens mounted on the camera body can perform blur correction in the Pitch directions and blur correction in the Yaw directions; and making the blur correction unit perform blur correction in the Roll directions within the second blur correction range and perform blur correction in the Pitch directions and blur correction in the Yaw directions within the blur correction ranges in the Pitch and Yaw directions set on the basis of the second blur correction range in accordance with the camera-body-side blur correction ratio when it is determined that the interchangeable lens mounted on the camera body can perform blur correction in the Pitch directions and blur correction in the Yaw directions, and making the interchangeable lens perform blur correction in the Pitch directions and blur correction in the Yaw directions in accordance with the interchangeable-lens-side blur correction ratio.

Another aspect of the present invention is a camera body to and from which an interchangeable lens is attachable and detachable, including:

a blur correction unit that performs blur correction in a plurality of rotation directions including Roll directions, which are directions of rotation on an optical axis of the interchangeable lens mounted on the camera body, Pitch directions, which are directions of rotation on an axis perpendicular to the optical axis, and Yaw directions, which are directions of rotation on an axis perpendicular to both the optical axis and the axis perpendicular to the optical axis;

a determination unit that determines whether or not the interchangeable lens mounted on the camera body can perform blur correction in the Pitch directions and blur correction in the Yaw directions;

a Roll blur correction range setting unit that sets a blur correction range in the Roll directions to be a first blur correction range for the blur correction unit performing blur correction in the Roll directions when the determination unit determines that the interchangeable lens mounted on the camera body cannot perform blur correction in the Pitch directions and blur correction in the Yaw directions or that sets a blur correction range in the Roll directions to be a second blur correction range, which is equal to or longer than the first blur correction range, for the blur correction unit performing blur correction in the Roll directions when the determination unit determines that the interchangeable lens mounted on the camera body can perform blur correction in the Pitch directions and blur correction in the Yaw directions;

a Pitch-Yaw blur correction range setting unit that sets blur correction ranges in the Pitch and Yaw directions for the blur correction unit performing blur correction in the Pitch directions and blur correction in the Yaw directions, on the basis of the first or second blur correction range set by the Roll blur correction range setting unit; and a blur correction ratio calculation unit that calculates a camera-body-side blur correction ratio and an interchangeable-lens-side blur correction ratio for both the camera body and the interchangeable lens performing blur correction in the Pitch directions and blur correction in the Yaw directions when the determination unit determines that the interchangeable lens mounted on the camera body can perform the blur correction in the Pitch directions and blur correction in the Yaw directions, and the blur correction unit performs blur correction in the Roll directions within the second blur correction range set by the Roll blur correction range setting unit when the determination unit determines that the interchangeable lens mounted on the camera body can perform blur correction in the Pitch directions and blur correction in the Yaw directions, and performs blur correction in the Pitch directions and blur correction in the Yaw directions within the blur correction ranges in the Pitch and Yaw directions set by the Pitch-Yaw blur correction range setting unit on the basis of the second blur correction range in accordance with the camera-body-side blur correction ratio calculated by the blur correction ratio calculation unit.

Another aspect of the present invention is an interchangeable lens configured to be attachable and detachable to and from a camera body, including:

a blur correction unit that performs blur correction in a plurality of rotation directions including Pitch directions, which are directions of rotation on an axis perpendicular to an optical axis of the interchangeable lens mounted on the camera body, and Yaw directions, which are directions of rotation on an axis perpendicular to the optical axis, wherein the blur correction unit performs blur correction in the Pitch directions and blur correction in the Yaw directions in accordance with an interchangeable-lens-side blur correction ratio obtained from the camera body when both the interchangeable lens and the camera body perform blur correction in the Pitch directions and blur correction in the Yaw directions.

BRIEF DESCRIPTION OF DRAWINGS

FIG. 4A is a first view showing an example of a relationship between the position of a blur correction lens included in an optical system and a maximum translation range over which the blur correction lens can be translated;

FIG. 4B is a second view showing an example of a relationship between the position of a blur correction lens included in an optical system and a maximum translation range over which the blur correction lens can be translated;

FIG. 6A shows a configuration example of each of a Yaw angle shaking amount calculation unit and a Pitch angle shaking amount calculation unit of the blur correction microcomputer according to the first embodiment;

FIG. 6B shows a configuration example of a Roll angle shaking amount calculation unit according to the first embodiment;

FIG. 9 schematically shows a configuration example of an image-sensor driving unit according to the first embodiment;

FIG. 10A is a first view showing a positional relationship between the effective pixel area of an image sensor and an image circle according to the first embodiment;

FIG. 13 shows a configuration example of each of a Yaw angle shaking amount calculation unit and a Pitch angle shaking amount calculation unit of the LCU according to the first embodiment;

FIG. 14 is a flowchart explaining an example of an operation performed by the blur correction microcomputer according to the first embodiment;

FIG. 15 is a flowchart explaining an example of an operation performed by the LCU according to the first embodiment;

FIG. 16B is a second view showing an example of the position in a case when the image sensor has been rotated and translated maximally according to the first embodiment;

FIG. 17 shows a relationship between maximum rotation amount θ1 and the maximum translation amount (which will be referred to by a1) of the image sensor shown in FIG. 16A and maximum rotation amount θ2 and the maximum translation amount (which will be referred to by a2) of the image sensor shown in FIG. 16B;

FIG. 21 shows an example of a relationship between Roll correction range length θ1 set in S302 shown in FIG. 19 and the Yaw and Pitch correction range lengths (both will be referred to as a1) set in S303 shown in FIG. 19 and also shows an example of a relationship between Roll correction range length θ2 set in S304 shown in FIG. 19 and the Yaw and Pitch correction range lengths (both will be referred to as a2) set in S305 shown in FIG. 19 in a case when the focal length is long (telescopic shooting);

FIG. 22A shows an example of a relationship between the focal length and θ1 and θ2 shown in FIG. 20 and FIG. 21;

FIG. 24 shows a configuration example of a Roll angle shaking amount calculation unit according to the third embodiment;

FIG. 27 is a flowchart explaining an example of an operation of the blur correction microcomputer according to the third embodiment.

DESCRIPTION OF EMBODIMENTS

Figure 1:
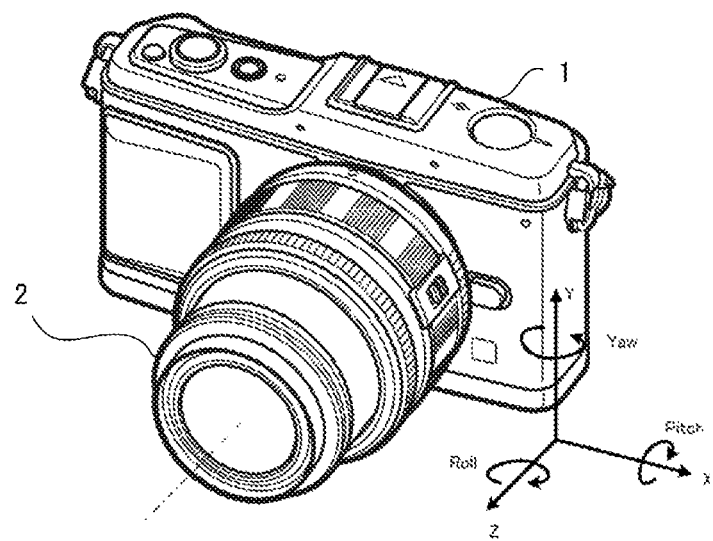
FIG. 1 shows an example of an external configuration of camera systems according to the respective embodiments and also shows the directions defined for the camera systems.

Hereinafter, by referring to the drawings, the embodiments of the present invention will be explained in detail.

By referring to FIG. 1 first, definitions will be given for the directions used in the explanations of the camera systems of the respective embodiments, which will be described later.

FIG. 1 shows an example of an external configuration of the camera systems according to the respective embodiments, which will be described later, and also shows the directions defined for the camera systems.

As shown in FIG. 1, the camera system according to each embodiment described later is an interchangeable lens camera with an interchangeable lens (also referred to as a lens unit) 2 mounted on a camera body 1. In that camera system, the X directions, the Y directions, the Z directions, the Pitch directions, the Yaw directions and the Roll directions will be defined as below.

The lateral directions (horizontal directions) of the camera body 1 are defined as X directions. Further, the right direction along the X directions seen from the position right in front of the camera body 1 is defined as the +X direction, while the left direction under the same condition is defined as the −X direction. This definition of the X directions applies also to the right and left directions of the imaging plane of an image sensor, which will be described later.

The longitudinal directions (vertical directions) of the camera body 1 are defined as Y directions. Further, the upper direction along the Y directions is defined as the +Y direction, while the lower direction along the Y directions is defined as the −Y direction. This definition of the Y directions applies also to the upper and lower directions of the imaging plane of an image sensor, which will be described later.

The direction of the optical axis of the interchangeable lens 2 mounted on the camera body 1 is defined as the Z direction. Further, the direction along the Z directions toward the front side from the back side of the camera body 1 is defined as the +Z direction, while the direction along the Z directions toward the back side from the front side of the camera body 1 is defined as the −Z direction.

The directions of the rotation on the X-directional axis are defined as the Pitch directions. Further, the left rotational direction along the Pitch directions with respect to the +X direction is defined as the +Pitch direction, while the right rotational direction along the Pitch directions with respect to the +X direction is defined as the −Pitch direction.

The directions of the rotation on the Y-directional axis are defined as the Yaw directions. Further, the right rotational direction along the Yaw directions with respect to the +Y direction is defined as the +Yaw direction, while the left rotational direction along the Yaw directions with respect to the +Y direction is defined as the −Yaw direction.

The directions of the rotation on the Z-directional axis are defined as the Roll directions. Further, the left rotational direction along the Roll directions with respect to the +Z direction is defined as the +Roll direction, while the right rotational direction along the Roll directions with respect to the +Z direction is defined as the −Roll direction.

As a matter of course, the positive and negative signs added to the directions defined above are used in accordance with the implementation directions of an angular velocity sensor, which will be described later, and therefore are not limited to the usages in the above examples.

First Embodiment

Figure 2:
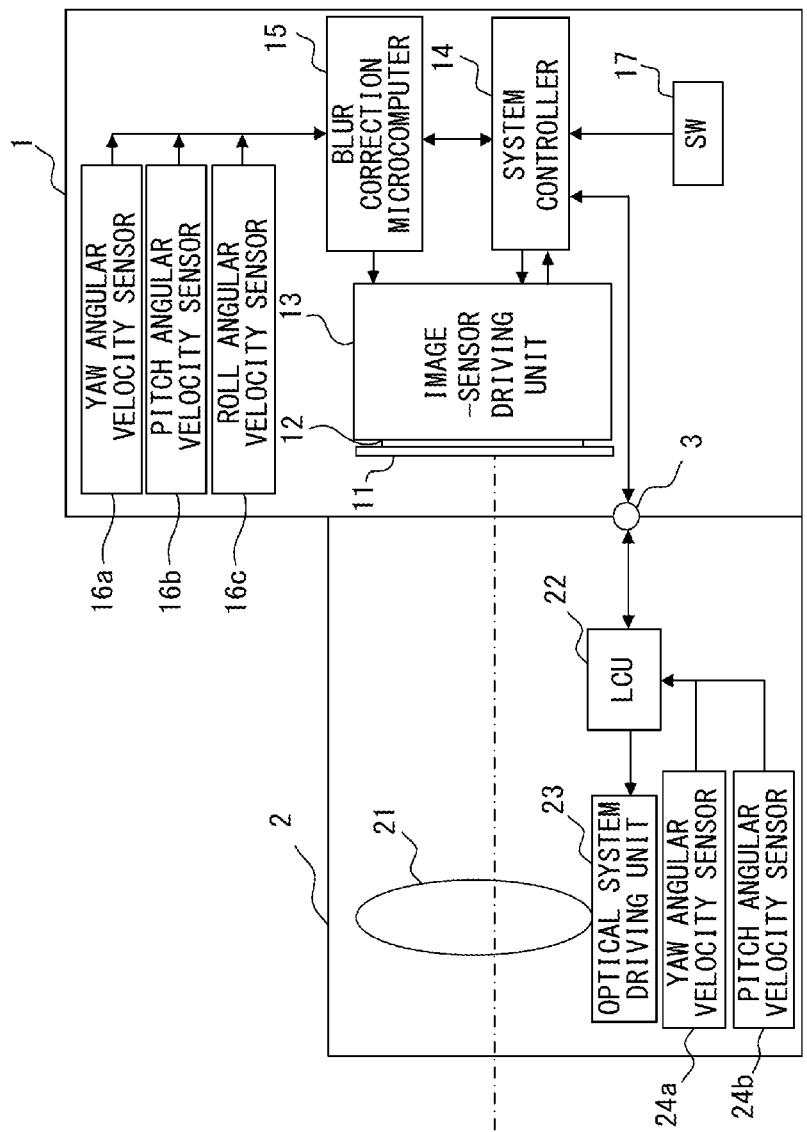
FIG. 2 shows a configuration example of a camera system according to a first embodiment of the present invention.

FIG. 2 shows a configuration example of a camera system according to a first embodiment of the present invention.

As shown in FIG. 2, a camera system according to the present embodiment has a configuration in which the interchangeable lens 2 is mounted on the camera body 1. Note that the camera body 1 is configured to allow the interchangeable lens 2 to be attached to it and detached from it. Note that the mounting of the interchangeable lens 2 on the camera body 1 is realized by jointing together the lens mount connection unit (not shown) provided to the interchangeable lens 2 and the body mount connection unit (not shown) provided to the camera body 1. This results in a situation where the interchangeable lens 2 is fixed to the camera body 1 and electric connection between the terminals in the respective mount connection units is realized so that communications between the camera body 1 and the interchangeable lens 2 are possible via a contact point 3.

The camera body 1 includes a focal plane shutter 11, an image sensor 12, an image-sensor driving unit 13, a system controller 14, a blur correction microcomputer 15, a Yaw angular velocity sensor 16a, a Pitch angular velocity sensor 16b, a Roll angular velocity sensor 16c and an SW (Switch) 17.

The focal plane shutter 11 is disposed in front of the image sensor 12 and opens or closes the shutter under control of the system controller 14 so as to bring the imaging plane of the image sensor 12 into an exposed state or a light-shielded state. Thereby, the exposure time is controlled.

The image sensor 12 is for example an image sensor such as a Charge Coupled Device (CCD), a Complementary Metal Oxide Semiconductor (CMOS), etc., and converts, under control of the system controller 14, a subject image formed on the imaging plane into an electric signal (photoelectric conversion). An electric signal obtained by the conversion is read as an image signal by the system controller 14.

Under control of the blur correction microcomputer 15, the image-sensor driving unit 13 translates the image sensor 12 in the X and Y directions and rotates the image sensor 12 on the center of the image sensor 12. Note that the center of the image sensor 12 is also the center of the effective pixel area of the imaging plane of the image sensor 12. The image-sensor driving unit 13 will be explained later in detail by referring to FIG. 9.

The system controller 14 performs control of the operations of the camera body 1, conducts communications via the contact point 3 with an LCU (Lens Control Unit) of the interchangeable lens 2, and also performs control of the operations of the interchangeable lens 2. In other words, the system controller 14 controls the overall operations of the camera system (the camera body 1 and the interchangeable lens 2). For example, according to a user's manipulation instruction reported by the SW 17, the system controller 14 controls corresponding operations. Also, the system controller 14 for example controls the focal plane shutter 11 and the image sensor 12. Also, the system controller 14 for example reads an image signal from the image sensor 12, and converts the signal into image data of a prescribed format. Also, the system controller 14 for example controls the starting, the termination, etc. of blur correction by conducting communications between the blur correction microcomputer 15 and the LCU 22. Also, when the interchangeable lens 2 can perform the blur correction in the Pitch and Yaw directions, the system controller 14 for example calculates a camera-body-side blur correction ratio and an interchangeable-lens-side blur correction ratio, which will be described later. Configurations for this calculation will be described later in detail by referring to FIG. 3.

Under control of the system controller 14, the blur correction microcomputer 15 controls the image-sensor driving unit 13 so that the image sensor 12 is moved in a direction in which an image blur caused by shaking is cancelled, on the basis of output from the Yaw angular velocity sensor 16a, the Pitch angular velocity sensor 16b, and the Roll angular velocity sensor 16c. The blur correction microcomputer 15 will be described later in detail by referring to FIG. 5.

The Yaw angular velocity sensor 16a detects the angular velocity in the Yaw directions. The Pitch angular velocity sensor 16b detects the angular velocity in the Pitch directions. The Roll angular velocity sensor 16c detects the angular velocity in the Roll directions. The Yaw angular velocity sensor 16a, the Pitch angular velocity sensor 16b and the Roll angular velocity sensor 16c are identical angular velocity sensors, but are installed in different directions depending upon the angular velocities to be detected by them.

The SW 17 receives various manipulation instructions (for example, a manipulation instruction to start shooting) from the user, and reports it to the system controller 14.

The interchangeable lens 2 includes an optical system 21, the LCU 22, an optical system driving unit 23, a Yaw angular velocity sensor 24a and a Pitch angular velocity sensor 24b.

The optical system 21 forms the light flux from the subject, as a subject image on the imaging plane of the image sensor 12. The optical system 21 includes a blur correction lens (not shown), which is a blur correction optical system for correcting an image blur.

The LCU 22 communicates with the system controller 14 via the contact point 3. Under control of the system controller 14, the LCU 22 controls operations of the interchangeable lens 2 (including blur correction operations). For example, the LCU 22 controls, on the basis of output from the Yaw angular velocity sensor 24a and the Pitch angular velocity sensor 24b, the optical system driving unit 23 so that the blur correction lens is moved to a direction in which an image blur caused by shaking is cancelled. Also, for example, the LCU 22 controls the focusing, the aperture, etc., although this is not described in detail. The LCU 22 will be described later in detail by referring to FIG. 12.

The optical system driving unit 23 translates the blur correction lens included in the optical system 21 to the X and Y directions under control of the LCU 22.

The Yaw angular velocity sensor 24a detects the angular velocity in the Yaw directions. The Pitch angular velocity sensor 24b detects the angular velocity in the Pitch directions. The Yaw angular velocity sensor 24a and the Pitch angular velocity sensor 24b are identical angular velocity sensors, but are installed in different directions depending upon the angular velocities to be detected by them.

Figure 3:
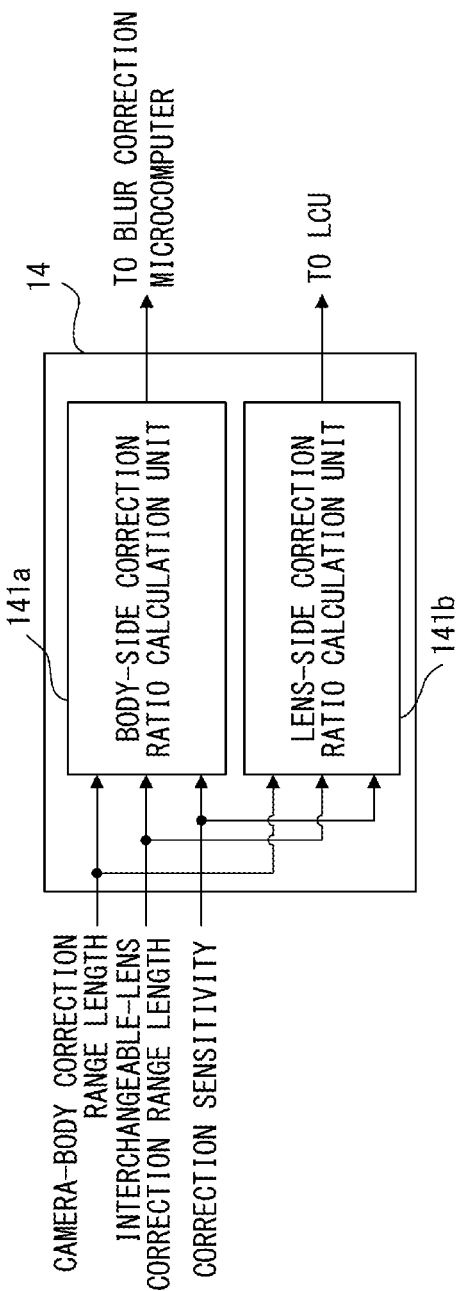
FIG. 3 shows an example of a configuration, included in a system controller according to the first embodiment, related to calculation of a camera-body-side correction ratio and an interchangeable-lens-side correction ratio.

FIG. 3 shows an example of a configuration related to calculation of a camera-body-side correction ratio and an interchangeable-lens-side correction ratio included in the system controller 14.

As shown in FIG. 3, the system controller 14 includes a body-side correction ratio calculation unit 141a and a lens-side correction ratio calculation unit 141b.

When the interchangeable lens 2 mounted on the camera body 1 can perform blur correction in the Pitch and Yaw directions, the body-side correction ratio calculation unit 141a calculates the camera-body-side correction ratio on the basis of the camera-body correction range length, the interchangeable-lens correction range length and the correction sensitivity, at for example regular intervals. Then, the body-side correction ratio calculation unit 141a outputs the camera-body-side correction ratio to the blur correction microcomputer 15. However, when the interchangeable lens 2 mounted on the camera body 1 cannot perform blur correction in the Pitch and Yaw directions, the body-side correction ratio calculation unit 141a does not perform the above calculation and outputs "1" as the camera-body-side correction ratio to the blur correction microcomputer 15. Alternatively, it is also possible to employ a configuration in which the multiplication of the camera-body-side correction ratio is not conducted in each of the Yaw angle shaking amount calculation unit and the Pitch angle shaking amount calculation unit of the blur correction microcomputer 15, which will be described later in detail.

When the interchangeable lens 2 mounted on the camera body 1 can perform blur correction in the Pitch and Yaw directions, the lens-side correction ratio calculation unit 141b calculates the interchangeable-lens-side correction ratio on the basis of the camera-body correction range length, the interchangeable-lens correction range length and the correction sensitivity, at for example regular intervals. Then, the lens-side correction ratio calculation unit 141b outputs an output signal based on the information of the calculated interchangeable-lens-side correction ratio to the LCU 22 via the contact point 3. However, when the interchangeable lens 2 mounted on the camera body 1 cannot perform blur correction in the Pitch and Yaw directions, the lens-side correction ratio calculation unit 141b does not perform the above calculation or output.

A camera-body correction range length is read from a memory (not shown) provided to the camera body 1, and an interchangeable-lens correction range length and a correction sensitivity are obtained from the LCU 22 via the contact point 3.

A camera-body correction range length is a maximum translation range length over which the image sensor 12 can be translated physically (over which the image sensor 12 can be moved in each of the X and Y directions), and is expressed by for example an absolute value.

An interchangeable-lens correction range length is a maximum translation range length over which the blur correction lens included in the optical system 21 can be translated physically (over which the blur correction lens can be moved in each of the X and Y directions), and is expressed by for example an absolute value.

When the interchangeable-lens correction range length in the interchangeable lens 2 is a fixed value regardless of the focal length of the optical system 21, the focal length changes the image plane movement amount range for which the blur correction lens included in the optical system 21 can perform blur correction (the range of the movement amount of the subject image on the imaging plane), which means that the correction sensitivity varies in accordance with the focal length of the optical system 21, as will be described later. However, the scope of the present invention is not limited to this, allowing for example a configuration in which the image plane movement amount range on which the blur correction lens can perform blur correction is a fixed value regardless of the focal length by changing the interchangeable-lens correction range length in accordance with the focal length of the optical system 21.

A correction sensitivity is a rate of change of an image plane movement amount (the movement amount of the subject image on the imaging plane) with respect to the translation amount of the blur correction lens included in the optical system 21. A correction sensitivity changes in response to the focal length (zooming magnification) of the optical system 21 of the interchangeable lens 2.

The camera-body-side correction ratio is a ratio at which the camera body performs blur correction in the Pitch and Yaw directions in a case when both the camera body 1 and the interchangeable lens 2 perform the blur correction in the Pitch and Yaw directions.

The interchangeable-lens-side correction ratio is a ratio at which the interchangeable lens performs blur correction in the Pitch and Yaw directions in a case when both the camera body 1 and the interchangeable lens 2 perform the blur correction in the Pitch and Yaw directions.

The camera-body-side correction ratio is calculated by for example Equation (1) below, while the interchangeable-lens-side correction ratio is calculated by for example Equation (2) below.

$$\text{Ratio}\_b = L\_b/(L\_b + L\_l \times K) \qquad \text{equation}(1)$$

$$\text{Ratio}\_l = L\_l \times K/(L\_b + L\_l \times K) \qquad \text{equation}(2)$$

In Equations (1) and (2) above, Ratio_b represents a camera-body-side correction ratio. Ratio_l represents an interchangeable-lens-side correction ratio. L_b represents a camera-body correction range length. L_l represents an interchangeable-lens correction range length. K represents a correction sensitivity.

Methods of calculating a camera-body-side correction ratio and an interchangeable-lens-side correction ratio are not limited to the above example, allowing for example a configuration in which one of the correction ratios is calculated by using Equation (1) or (2) above and the calculation result is subtracted from 1 so as to calculate the other correction ratio.

Further explanations will now be given for interchangeable-lens correction range length L_l.

FIG. 4A and FIG. 4B show an example of a relationship between the position of the blur correction lens included in the optical system 21 and the maximum translation range over which the blur correction lens can be translated.

FIG. 4A shows a case where the position of the blur correction lens (the position of the center of the optical axis of the blur correction lens) is at initial position O (X:0, Y:0), while FIG. 4B shows a case where the position of the blur correction lens has been translated from the initial position by interchangeable-lens correction range length L_l in each of the X and Y directions and the blur correction lens is currently at position O' (X:L_l, Y:L_l). In FIG. 4A and FIG. 4B, Rl_m represents a maximum translation range over which the blur correction lens can be translated physically.

As described above, interchangeable-lens correction range length L_l represents the displacement amount of the position, in the X and Y directions, of the blur correction lens when the blur correction lens has been translated maximally within maximum translation range Rl_m from initial position O (for example the translation from O to O').

Figure 5:
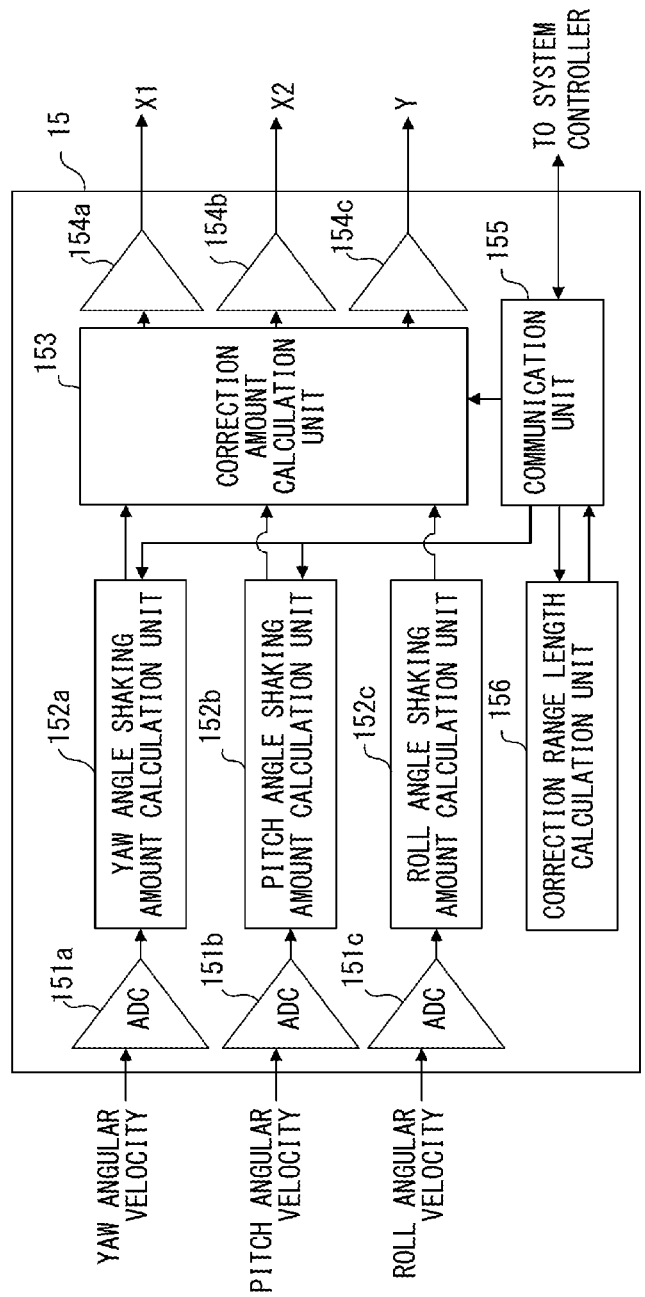
FIG. 5 shows a configuration example of a blur correction microcomputer according to the first embodiment.

FIG. 5 shows a configuration example of the blur correction microcomputer 15.

As shown in FIG. 5, the blur correction microcomputer 15 includes analog-to-digital converters (ADCs) 151 (151a, 151b and 151c), a Yaw angle shaking amount calculation unit 152a, a Pitch angle shaking amount calculation unit 152b, a Roll angle shaking amount calculation unit 152c, a correction amount calculation unit 153, drivers 154 (154a, 154b and 154c), a communication unit 155, and a correction range length calculation unit 156.

The ADC 151a converts an analog signal output from the Yaw angular velocity sensor 16a (Yaw angular velocity) into a digital signal. The ADC 151b converts an analog signal output from the Pitch angular velocity sensor 16b (Pitch angular velocity) into a digital signal. The ADC 151c converts an analog signal output from the Roll angular velocity sensor 16c (Roll angular velocity) into a digital signal.

The Yaw angle shaking amount calculation unit 152a calculates the X-directional image plane movement amount (also referred to as Yaw angle shaking amount) on the basis of output from the ADC 151a, the optical characteristic (focal length) of the optical system 21 of the interchangeable lens 2 and the camera-body-side correction ratio. The Pitch angle shaking amount calculation unit 152b calculates the Y-directional image plane movement amount (also referred to as Pitch angle shaking amount) on the basis of output from the ADC 151b, the optical characteristic (focal length) of the optical system 21 of the interchangeable lens 2 and the camera-body-side correction ratio. Note that the optical characteristic (focal length) of the optical system 21 of the interchangeable lens 2 is obtained from the LCU 22 via the contact point 3, the system controller 14 and the communication unit 155 at for example regular intervals.

The camera-body-side correction ratio is obtained from the body-side correction ratio calculation unit 141a of the system controller 14 via the communication unit 155 at for example regular intervals. The Yaw angle shaking amount calculation unit 152a and the Pitch angle shaking amount calculation unit 152b will be explained in detail later by referring to FIG. 6A.

The Roll angle shaking amount calculation unit 152c calculates the image plane rotation amount (the rotation amount of the subject image on the imaging plane) (also referred to as a Roll angle shaking amount). The Roll angle shaking amount calculation unit 152c will be explained in detail later by referring to FIG. 6B.

On the basis of the calculation results obtained by the Yaw angle shaking amount calculation unit 152a, the Pitch angle shaking amount calculation unit 152b and the Roll angle shaking amount calculation unit 152c (the Yaw angle shaking amount, the Pitch angle shaking amount and the Roll angle shaking amount), and of a Roll correction range length, a Yaw correction range length and a Pitch correction range length, which will be described later, set by the correction range length calculation unit 156, the correction amount calculation unit 153 calculates the driving amount of the image-sensor driving unit 13 (the driving amounts of an X1 driving unit, an X2 driving unit and a Y driving unit, which will be described later) for moving the image sensor 12 in a direction in which the Yaw angle shaking amount, the Pitch angle shaking amount and the Roll angle shaking amount are cancelled. The correction amount calculation unit 153 will be explained later in detail by referring to FIG. 7.

The driver 154a outputs, to the image-sensor driving unit 13, a driving pulse in accordance with the driving amount of the X1 driving unit, which will be described later, calculated by the correction amount calculation unit 153. The driver 154b outputs, to the image-sensor driving unit 13, a driving pulse in accordance with the driving amount of the X2 driving unit, which will be described later, calculated by the correction amount calculation unit 153. The driver 154c outputs, to the image-sensor driving unit 13, a driving pulse in accordance with the driving amount of the Y driving unit, which will be described later, calculated by the correction amount calculation unit 153. This causes driving of the X1 driving unit, the X2 driving unit and the Y driving unit of the image-sensor driving unit 13 in response to the respective driving pulses so that the image sensor 12 moves in a direction in which the above Yaw angle shaking amount, Pitch angle shaking amount and Roll angle shaking amount are cancelled.

The communication unit 155 communicates with the system controller 14 and transmits data to and receives data from each of the Yaw angle shaking amount calculation unit 152a, the Pitch angle shaking amount calculation unit 152b, the correction amount calculation unit 153 and the correction range length calculation unit 156. For example, the communication unit 155 receives an instruction for starting or terminating blur correction etc. from the system controller 14. Also, the communication unit 155 receives from the system controller 14 information on whether or not the interchangeable lens 2 mounted on the camera body 1 can perform blur correction in the Pitch directions and the Yaw directions (lens blur correction information).

Lens blur correction information is input to the correction range length calculation unit 156 from the system controller 14 via the communication unit 155. Then, on the basis of the input lens blur correction information, the correction range length calculation unit 156 determines or calculates each of the Roll correction range length, the Yaw correction range length and the Pitch correction range length in accordance with whether or not the interchangeable lens 2 mounted on the camera body 1 can perform blur correction in the Pitch directions and the Yaw directions. Then, they are set in the correction amount calculation unit 153 via the communication unit 155. The correction range length calculation unit 156 will be explained in detail by referring to FIG. 8.

FIG. 6A shows a configuration example of each of the Yaw angle shaking amount calculation unit 152a and the Pitch angle shaking amount calculation unit 152b. Note that the Yaw angle shaking amount calculation unit 152a and the Pitch angle shaking amount calculation unit 152b have a similar configuration.

As shown in FIG. 6A, each of the Yaw angle shaking amount calculation unit 152a and the Pitch angle shaking amount calculation unit 152b includes multipliers 1521 and 1522 and an integrator 1523.

The multiplier 1521 multiplies an output (angular velocity) of the ADC 151 (ADC 151a or the ADC 151b) by the optical characteristic (focal length) of the optical system 21 of the interchangeable lens 2. The multiplier 1522 multiples the multiplication result of the multiplier 1521 by the camera-body-side correction ratio. The integrator 1523 performs time integration for the multiplication result of the multiplier 1522, and outputs the result (image plane movement amount).

FIG. 6B shows a configuration example of the Roll angle shaking amount calculation unit 152c.

As shown in FIG. 6B, the Roll angle shaking amount calculation unit 152c includes an integrator 1524. The integrator 1524 performs time integration for output of the ADC 151c, and outputs the result (image plane rotation amount).

Figure 7:
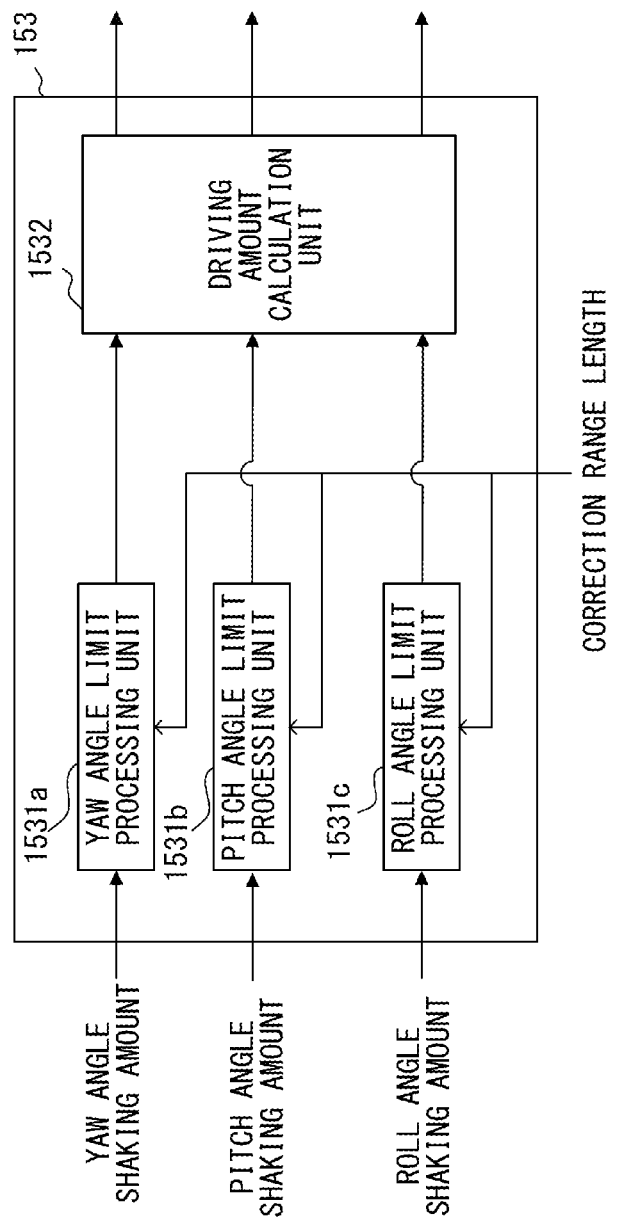
FIG. 7 shows a configuration example of a correction amount calculation unit according to the first embodiment.

FIG. 7 shows a configuration example of the correction amount calculation unit 153.

As shown in FIG. 7, the correction amount calculation unit 153 includes a Yaw angle limit processing unit 1531a, a Pitch angle limit processing unit 1531b, a Roll angle limit processing unit 1531c and a driving amount calculation unit 1532.

When the Yaw angle shaking amount, which is a calculation result by the Yaw angle shaking amount calculation unit 152a, is greater than the Yaw correction range length set by the correction range length calculation unit 156, the Yaw angle limit processing unit 1531a restricts that Yaw angle shaking amount within the Yaw correction range length, and outputs it. When the Yaw angle shaking amount is not greater than the Yaw correction range, the Yaw angle limit processing unit 1531a outputs that Yaw angle shaking amount as it is.

When the Pitch angle shaking amount, which is a calculation result by the Pitch angle shaking amount calculation unit 152b, is greater than the Pitch correction range length set by the correction range length calculation unit 156, the Pitch angle limit processing unit 1531b restricts that Pitch angle shaking amount within the Pitch correction range length, and outputs it. When the Pitch angle shaking amount is not greater than the Pitch correction range, the Pitch angle limit processing unit 1531b outputs that Pitch angle shaking amount as it is.

When the Roll angle shaking amount, which is a calculation result by the Roll angle shaking amount calculation unit 152c, is greater than the Roll correction range length set by the correction range length calculation unit 156, the Roll angle limit processing unit 1531c restricts that Roll angle shaking amount within the Roll correction range length, and outputs it. When the Roll angle shaking amount is not greater than the Roll correction range, the Roll angle limit processing unit 1531c outputs that Roll angle shaking amount as it is.

On the basis of the output of the Yaw angle limit processing unit 1531a, the Pitch angle limit processing unit 1531b and the Roll angle limit processing unit 1531c (the Yaw angle shaking amount, the Pitch angle shaking amount and the Roll angle shaking amount), the driving amount calculation unit 1532 calculates the driving amount of the image-sensor driving unit 13 (the driving amounts of the X1 driving unit, the X2 driving unit and the Y driving unit, which will be described later) for moving the image sensor 12 in a direction in which the Yaw angle shaking amount, the Pitch angle shaking amount and the Roll angle shaking amount are cancelled.

Figure 8:
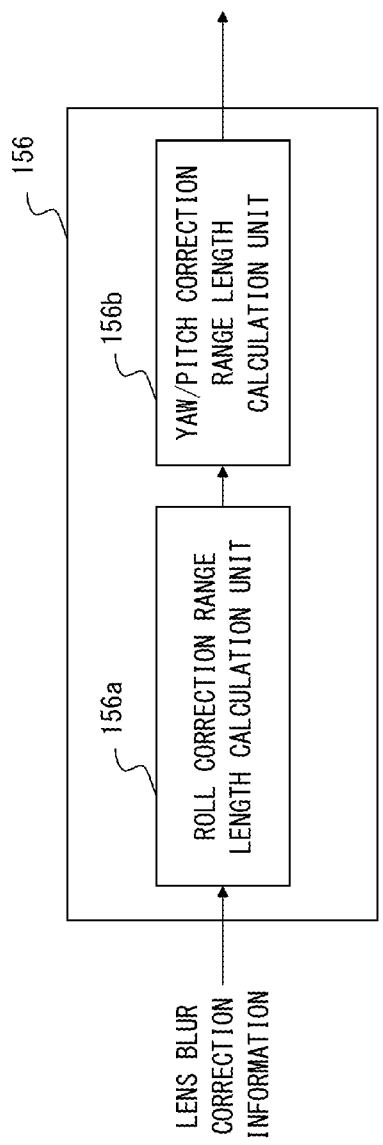
FIG. 8 shows a configuration example of a correction range length calculation unit according to the first embodiment.

FIG. 8 shows a configuration example of the correction range length calculation unit 156.

As shown in FIG. 8, the correction range length calculation unit 156 includes a Roll correction range length calculation unit 156a and a Yaw/Pitch correction range length calculation unit 156b.

Lens blur correction information is input to the Roll correction range length calculation unit 156a from the system controller 14 via the communication unit 155. Then, on the basis of the lens blur correction information, the Roll correction range length calculation unit 156a determines the Roll correction range length in accordance with whether or not the interchangeable lens 2 mounted on the camera body 1 can perform blur correction in the Pitch directions and the Yaw directions. The Roll correction range length is expressed by for example an absolute value.

The Yaw/Pitch correction range length calculation unit 156b calculates a Yaw correction range length and a Pitch correction range length on the basis of the Roll correction range length determined by the Roll correction range length calculation unit 156a. A Yaw correction range length and a Pitch correction range length are expressed by for example an absolute value.

Then, the correction range length calculation unit 156 sets, in the correction amount calculation unit 153 via the communication unit 155, the Roll correction range length determined by the Roll correction range length calculation unit 156a and the Yaw correction range length and the Pitch correction range length calculated by the Yaw/Pitch correction range length calculation unit 156b.

A Roll correction range length, a Yaw correction range length and a Pitch correction range length will be described in detail by referring to FIG. 10A, FIG. 10B and FIG. 11.

FIG. 9 schematically shows a configuration example of the image-sensor driving unit 13.

As shown in FIG. 9, the image-sensor driving unit 13 includes an X1 driving unit 131, an X2 driving unit 132, a Y driving unit 133, a fixation unit 134 and a movable unit 135.

The X1 driving unit 131 drives in accordance with output from the driver 154a. The X2 driving unit 132 drives in accordance with output from the driver 154b. The Y driving unit 133 drives in accordance with output from the driver 154c.

The fixation unit 134 supports the movable unit 135 in such a manner that the movable unit 135 can be translated in the X and Y directions and can be rotated on the XY plane. The image sensor 12 is fixed to the movable unit 135. This makes the image sensor 12 cooperate with the movable unit 135. The rotation center of the movable unit 135 coincides with the center of the image sensor 12 (the center of the effective pixel area).

In the image-sensor driving unit 13 having the above configuration, translation in the X directions and rotation on the XY plane of the movable unit 135 that is coordinating with the image sensor 12 are caused by the driving of the X1 driving unit 131 and the X2 driving unit 132. Translation in the Y directions of the movable unit 135 that is coordinating with the image sensor 12 is caused by the driving of the Y driving unit 133. Translation in the X directions of the movable unit 135 coordinating with the image sensor 12 is caused by making the X1 driving unit 131 and the X2 driving unit 132 have the same driving amounts and the same driving directions. Rotation on the XY plane of the movable unit 135 coordinating with the image sensor 12 is caused by making the X1 driving unit 131 and the X2 driving unit 132 have the same driving amounts and have opposite driving directions.

In the image-sensor driving unit 13 having the above configuration, each of the X1 driving unit 131, the X2 driving unit 132 and the Y driving unit 133 is configured by using an electromagnetic linear motor having an electromagnetic coil disposed in coordination with the movable unit 135 and a fixed magnet disposed in the fixation unit (for example a voice coil motor). In such a case, in each of the X1 driving unit 131, the X2 driving unit 132 and the Y driving unit 133, when output (driving voltage or driving current) from a corresponding driver is supplied, a driving current that is proportional to the output flows through the electromagnetic coil to thereby move the movable unit 135 by the interaction of the magnetic fields generated between the electromagnetic coil and fixed magnet.

Also, in such a case, when the rotation angle, which is the rotation amount of the rotation of the movable unit 135 coordinating with the image sensor 12, is slight, the rotation angle is a value that is proportional to a difference between the movement amount of the X1 driving unit 131 (the electromagnetic coil of the X1 driving unit 131) and the movement amount of the X2 driving unit 132 (the electromagnetic coil of the X2 driving unit 132). This rotation angle is obtained by Equation (3) below.

$$\theta = A \times (D2 - D1) \quad \text{Equation (3)}$$

In Equation (3) above, θ represents a rotation angle. A represents a proportional constant, and is determined by the positions of the X1 driving unit 131 (electromagnetic coil of the X1 driving unit 131) and the X2 driving unit 132 (electromagnetic coil of the X2 driving unit 132). D2 represents the movement amount of the X2 driving unit 132 (the electromagnetic coil of the X2 driving unit 132), while D1 represents the movement amount of the X1 driving unit 131 (electromagnetic coil of the X1 driving unit 131). However, D1 and D2 represent values having a positive or negative sign that are in accordance with the movement direction.

Note that image sensor 12 moved by the driving of the image-sensor driving unit 13 has to have the entire effective pixel area of its imaging plane within the image circle in order to secure the optical performance of the subject image formed on that imaging plane. An image circle used herein refers to an image scope that fully corresponds to the optical performance with respect to the subject image formed on the imaging plane by the image-shooting lens. This is because even partial protrusion of the effective pixel area of the imaging plane from the image circle leads to a reduced light amount, a degraded resolution, etc. in the protruding portion, which will result in deterioration in the image quality.

The present embodiment, therefore, restricts the driving of the image-sensor driving unit 13 by using the Roll correction range length, the Yaw correction range length and the Pitch correction range length set by the correction range length calculation unit 156 in order to prevent a situation where the effective pixel area of the image sensor 12 moved by the driving of the image-sensor driving unit 13 protrudes from the image circle.

Now, explanations will be given for a Roll correction range length, a Yaw correction range length and a Pitch correction range length by referring to FIG. 10A, FIG. 10B and FIG. 11.

Figure 10B:
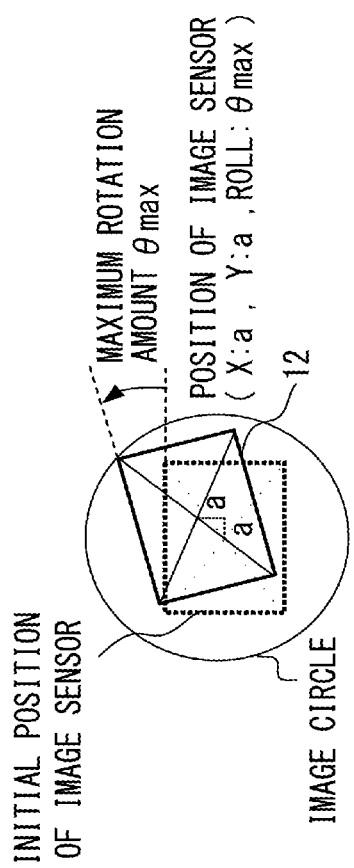
FIG. 10B is a second view showing a positional relationship between the effective pixel area of the image sensor and the image circle according to the first embodiment.

FIG. 10A and FIG. 10B show a positional relationship between the effective pixel area of the image sensor 12 and the image circle. For the sake of convenience of explanation, FIG. 10A and FIG. 10B show the scope of the image sensor 12 and the scope of the effective pixel area of the image sensor 12 as an identical area.

FIG. 10A shows an example of a positional relationship between the effective pixel area of the image sensor 12 and the image circle when the image sensor 12 is at the origin (initial position). In FIG. 10A, R represents the radius of the image circle. L represents a result of dividing by 2 the length of a diagonal line of the effective pixel area of the image sensor 12. $\theta_L$ represents the angle between a diagonal line of the image sensor 12 and the line perpendicular to a long side of the effective pixel area of the image sensor 12.

FIG. 10B shows an example of a positional relationship between the effective pixel area of the image sensor 12 and the image circle in a case when the driving of the image-sensor driving unit 13 has translated and rotated the image sensor 12 to a position at which part of the periphery of the effective pixel area of the image sensor 12 contacts part of the periphery of the image circle without protrusion of the effective pixel area of the image sensor 12 from the image circle. In FIG. 10B, "a" represents the translation amount from the origin in each of the X and Y directions of the image sensor 12, while θmax represents the rotation amount of the image sensor 12.

In the present embodiment, translation amount (a) from the origin in each of the X and Y directions of the image sensor 12 is also referred to as a maximum translation amount when the positional relationship is such that part of the periphery of the effective pixel area of the image sensor 12 contacts part of the periphery of the image circle without protrusion of the effective pixel area of the image sensor 12, as shown as the positional relationship shown in FIG. 10B. Also, each translation amount (a) is treated as each of the Yaw correction range length and the Pitch correction range length. Also, the rotation amount (θmax) of the image sensor 12 in the above positional relationship is also referred to as the maximum rotation amount, and is treated as the Roll correction range length.

The relationship between maximum translation amount (a) in each of the X and Y directions and maximum rotation amount (θmax) is represented by Equations (5) and (6) below from Equation (4) below.

$$R^2 = (a + L \sin(\theta_L - \theta \max))^2 + (a + L \cos(\theta_L - \theta \max))^2 \quad \text{Equation (4)}$$

$$a = \frac{-L(\sin(\theta_L - \theta \max) + \cos(\theta_L - \theta \max)) + \sqrt{L^2 \times (\sin(\theta_L - \theta \max) + \cos(\theta_L - \theta \max))^2 - 2 \times (L^2 - R^2)}}{2} \quad \text{Equation (5)}$$

$$\theta \max = \theta_L + \frac{\pi}{4} - \sin^{-1}\left(\frac{R^2 - (a^2 + L^2)}{2\sqrt{2}\,aL}\right) \qquad \text{Equation (6)}$$

Note that Equation (5) above can also be considered to be a relationship of maximum translation amount (a) in each of the X and Y directions with respect to maximum rotation amount (θmax). Also, Equation (6) above can also be considered to be a relationship of maximum translation amount (θmax) with respect to maximum translation amount (a) in each of the X and Y directions.

According to Equations (5) and (6), maximum translation amount (a) in each of the X and Y directions and maximum rotation amount (θmax) are not both determined at the same time, and instead when one of them is determined, the other is calculated by Equation (5) or (6) above.

According to the present embodiment, maximum rotation amount (θmax) is determined so as to calculate maximum translation amount (a) in each of the X and Y directions by Equation (5) from that maximum rotation amount (θmax). In other words, the present embodiment determines a Roll correction range length and thereafter calculates a Yaw correction range length and a Pitch correction range length by Equation (5) from that Roll correction range length.

Figure 11:
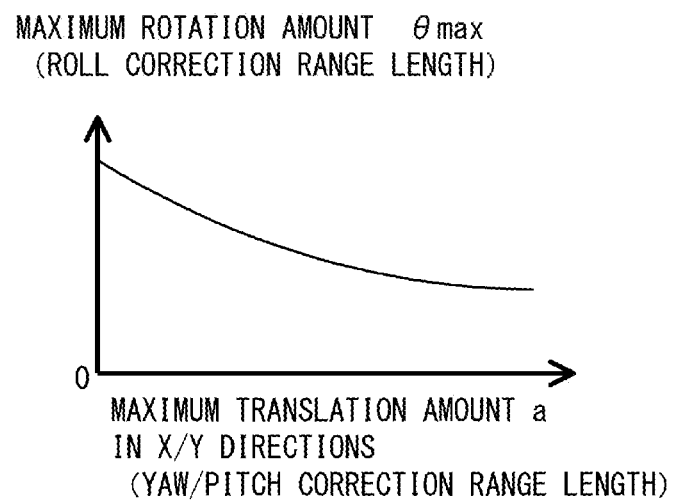
FIG. 11 shows an example of a relationship between maximum rotation amount (θmax) and maximum translation amount (a) in each of the X and Y directions according to the first embodiment.

FIG. 11 shows an example of a relationship between maximum rotation amount (θmax) and maximum translation amount (a) in each of the X and Y directions.

As shown in FIG. 11, the relationship between maximum rotation amount (θmax) and maximum translation amount (a) in each of the X and Y directions is such that an increase in one of them leads to a decrease in the other. Specifically, an increase in maximum rotation amount (θmax) (an increase in the Roll correction range length) leads to a decrease in maximum translation amount (a) in each of the X and Y directions (a decrease in each of the Yaw and Pitch correction range lengths). A decrease, by contrast, in maximum rotation amount (θmax) (a decrease in the Roll correction range length) leads to an increase in maximum translation amount (a) in each of the X and Y directions (an increase in each of the Yaw and Pitch correction range lengths).

Figure 12:
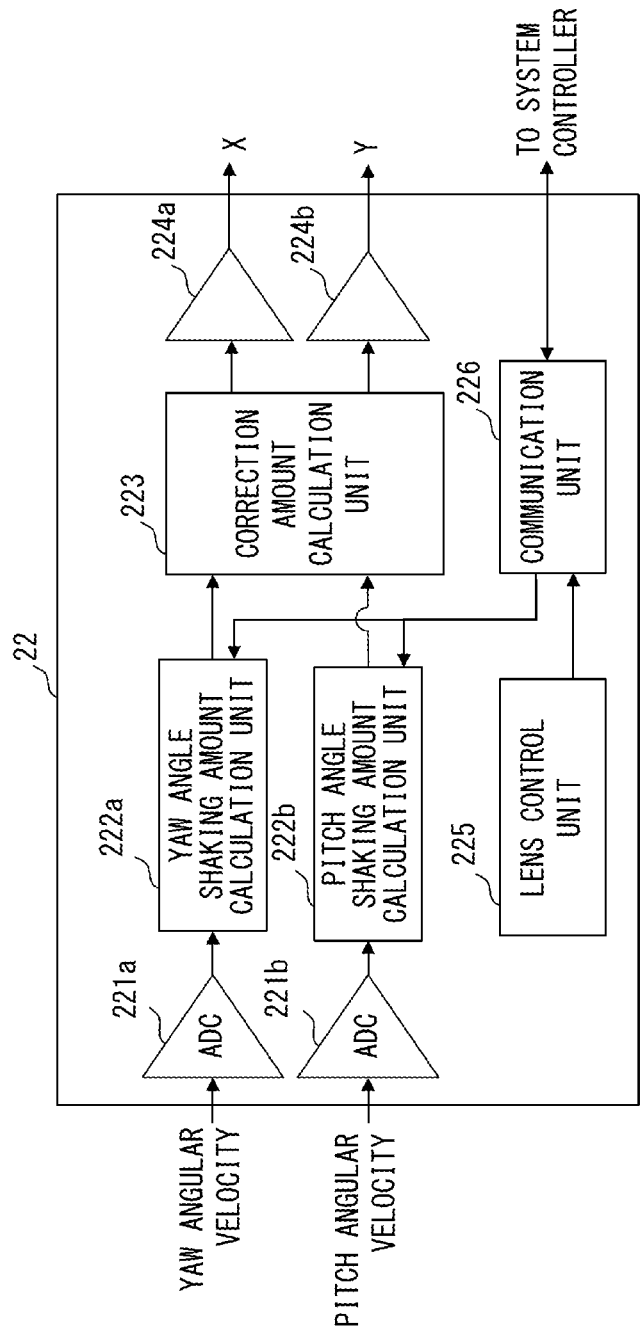
FIG. 12 shows a detailed configuration example of an LCU according to the first embodiment.

FIG. 12 shows a configuration example of the LCU 22.

As shown in FIG. 12, the LCU 22 includes ADCs 221 (221a and 221b), a Yaw angle shaking amount calculation unit 222a, a Pitch angle shaking amount calculation unit 222b, a correction amount calculation unit 223, drivers 224 (224a and 224b), a lens control unit 225 and a communication unit 226.

The ADC 221a converts an analog signal output from the Yaw angular velocity sensor 24a into a digital signal. The ADC 221b converts an analog signal output from the Pitch angular velocity sensor 24b into a digital signal.

The Yaw angle shaking amount calculation unit 222a calculates the X-directional movement amount (also referred to as Yaw angle shaking amount) of a blur correction lens corresponding to the X-directional image plane movement amount on the basis of the output from the ADC 221a, the optical characteristic of the optical system 21 of the interchangeable lens 2 and the interchangeable-lens-side correction ratio. The Pitch angle shaking amount calculation unit 222b calculates the Y-directional movement amount (also referred to as Pitch angle shaking amount) of a blur correction lens corresponding to the Y-directional image plane movement amount on the basis of the output from the ADC 221b, the optical characteristic of the optical system 21 of the interchangeable lens 2 and the interchangeable-lens-side correction ratio. Note that the optical characteristic of the optical system 21 of the interchangeable lens 2 is obtained from the lens control unit 225 via the communication unit 226 at for example regular intervals. The interchangeable-lens-side correction ratio is obtained from the system controller 14 (the lens-side correction ratio calculation unit 141b) via the contact point and the communication unit 226 at for example regular intervals. The Yaw angle shaking amount calculation unit 222a and the Pitch angle shaking amount calculation unit 222b will be explained in detail by referring to FIG. 13.

On the basis of the calculation results by the Yaw angle shaking amount calculation unit 222a and the Pitch angle shaking amount calculation unit 222b (Yaw angle shaking amount and Pitch angle shaking amount), the correction amount calculation unit 223 calculates the X-directional driving amount and the Y-directional driving amount of the optical system driving unit 23 for moving the blur correction lens included in the optical system 21 in a direction in which the Yaw angle shaking amount and the Pitch angle shaking amount are cancelled. Note that an X-directional driving amount is a driving amount for moving the blur correction lens in the X directions and a Y-directional driving amount is a driving amount for moving the blur correction lens in the Y directions.

The driver 224a outputs, to the optical system driving unit 23, a driving pulse in accordance with the X-directional driving amount calculated by the correction amount calculation unit 223. The driver 224b outputs, to the optical system driving unit 23, a driving pulse in accordance with the Y-directional driving amount calculated by the correction amount calculation unit 223. This causes driving of the optical system driving unit 23 in accordance with the respective driving pulses so that the blur correction lens moves in a direction in which the above Yaw angle shaking amount and Pitch angle shaking amount are cancelled.

The lens control unit 225 reports the lens information of the interchangeable lens 2 to the system controller 14 via the communication unit 226 and the contact point 3. The lens information of the interchangeable lens 2 includes at least one of information of the blur correction function of the interchangeable lens 2, the interchangeable-lens correction range length, the focal length of the optical system 21 and the correction sensitivity. The information of the blur correction function of the interchangeable lens 2 includes information representing whether the blur correction function of the interchangeable lens 2 is set to be effective or to be ineffective. This setting of the function to be effective or ineffective is conducted by for example a user manipulation made on the manipulation unit (not shown) of the interchangeable lens 2. Also, the lens control unit 225 reports the focal length of the optical system 21 and the correction sensitivity to the Yaw angle shaking amount calculation unit 222a and the Pitch angle shaking amount calculation unit 222b via the communication unit 226. The lens control unit 225 controls the focusing, the aperture, etc., which will not be described in detail.

The communication unit 226 communicates with the system controller 14 via the contact point 3 and transmits data to and receives data from each of the Yaw angle shaking amount calculation unit 222a, the Pitch angle shaking amount calculation unit 222b, and the lens control unit 225. For example, the communication unit 226 receives an instruction for starting or terminating the blur correction etc. from the system controller 14 via the contact point 3.

FIG. 13 shows a configuration example of each of the Yaw angle shaking amount calculation unit 222a and the Pitch angle shaking amount calculation unit 222b. Note that the Yaw angle shaking amount calculation unit 222a and the Pitch angle shaking amount calculation unit 222b have a similar configuration.

As shown in FIG. 13, each of the Yaw angle shaking amount calculation unit 222a and the Pitch angle shaking amount calculation unit 222b includes multipliers 2221 and 2222 and an integrator 2223.

The multiplier 2221 multiplies an output (angular velocity) of the ADC 221 (the ADC 221a or the ADC 221b) by the optical characteristic of the optical system 21. The optical characteristic of the optical system 21 is expressed by Equation (7) below.

$$OP = f/K \qquad \text{Equation (7)}$$

In Equation (7) above, OP represents the optical characteristic of the optical system 21, f represents the focal length of the optical system 21, and K represents the correction sensitivity.

The multiplier 2222 multiplies the multiplication result of the multiplier 2221 by the interchangeable-lens-side correction ratio. The integrator 2223 performs time integration for the multiplication result of the multiplier 2222, and outputs the result (the movement amount of the blur correction lens corresponding to the image plane movement amount (also referred to as an angle shaking amount)).

In the camera system according to the present embodiment having the above configuration, part of the blur correction microcomputer 15 of the camera body 1 is an example of a blur correction unit that performs blur correction in a plurality of directions including Roll directions, which are directions of rotation on the optical axis of an interchangeable lens mounted on the camera body, Pitch directions, which are directions of rotation on the axis perpendicular to that optical axis, and Yaw directions, which are directions of rotation on the axis perpendicular to both the optical axis and the axis perpendicular to the optical axis. Another part of the blur correction microcomputer 15 is an example of a determination unit determining whether or not an interchangeable lens mounted on the camera body can perform blur correction in the Pitch and Yaw directions. Part of the correction amount calculation unit 153 (including the Roll correction range length calculation unit 156a) of the blur correction microcomputer 15 is an example of a Roll blur correction unit that sets a blur correction range in the Roll directions to be a first blur correction range for the blur correction unit performing blur correction in the Roll directions when it is determined by the determination unit that the interchangeable lens mounted on the camera body cannot perform the blur correction in the Pitch and Yaw directions or that sets a blur correction range in the Roll directions to be a second blur correction range, which is equal to or longer than the first blur correction range, for the blur correction unit performing blur correction in the Roll directions when it is determined by the determination unit that the interchangeable lens mounted on the camera body can perform the blur correction in the Pitch and Yaw directions. Another part of the correction amount calculation unit 153 of the blur correction microcomputer 15 (including the Yaw/Pitch correction range length calculation unit 156b) is an example of a Pitch-Yaw blur correction range setting unit that sets blur correction ranges in the Pitch and Yaw directions for the blur correction unit performing the blur correction in the Pitch and Yaw directions, on the basis of the first or second blur correction ranges set by the Roll blur correction range setting unit. Part of the system controller 14 of the camera body 1 (including the body-side correction ratio calculation unit 141a and the lens-side correction ratio calculation unit 141b) is an example of a blur correction ratio calculation unit that calculates a camera-body-side blur correction ratio and an interchangeable-lens-side blur correction ratio for the camera body and the interchangeable lens performing the correction in the Pitch and Yaw directions when it is determined by the determination unit that the interchangeable lens mounted on the camera body can perform the blur correction in the Pitch and Yaw directions. Another part of the system controller 14 is an example of an optical information obtainment unit that obtains, from an interchangeable lens, optical information about the interchangeable lens including the focal length information of the interchangeable lens. Part of the LCU 22 of the interchangeable lens 2 is an example of a blur correction unit that performs blur correction in a plurality of directions including Pitch directions, which are directions of the rotation on an axis perpendicular to the optical axis of the interchangeable lens mounted on the camera body, and Yaw directions, which are directions of the rotation on an axis perpendicular to that optical axis.

Next, explanations will be given for a blur correction operation (camera shake correction operation) conducted by the camera system according to the present embodiment in which the interchangeable lens 2 is mounted on the camera body 1.

FIG. 14 is a flowchart explaining an example of an operation repeated by the blur correction microcomputer 15 of the camera body 1 during a blur correction operation. FIG. 15 is a flowchart explaining an example of an operation repeated by the LCU 22 of the interchangeable lens 2 during a blur correction operation.

The operations shown in FIG. 14 and FIG. 15 are repeated in parallel when the interchangeable lens 2 mounted on the camera body 1 can perform blur correction in the Yaw and Pitch directions (when the blur correction function of the interchangeable lens 2 is set to be effective). Otherwise (when the blur correction function of the interchangeable lens 2 is set to be ineffective), only the operation shown in FIG. 14 is repeated (the operation shown in FIG. 15 is not performed).

In the present example, an example will be explained where the interchangeable lens 2 is mounted on the camera body 1. However, when for example an interchangeable lens not provided with a blur correction function is mounted on the camera body 1, an operation similar to that of a case where the interchangeable lens 2 mounted on the camera body 1 cannot perform the blur correction in the Yaw and Pitch directions is performed.

When the blur correction operation has started in the camera body 1 as shown in FIG. 14, the blur correction microcomputer 15 determines whether or not the interchangeable lens 2 mounted on the camera body 1 can perform blur correction in the Yaw and Pitch directions (S101) (whether or not the blur correction function of the interchangeable lens 2 is set to be effective) (S101).

The determination in s101 is made for example as follows. First, the system controller 14 of the camera body 1 communicates with the LCU 22 of the interchangeable lens 2 so as to obtain from the LCU 22 information on the blur correction function of the interchangeable lens 2. This information is obtained from the LCU 22 as a response to an inquiry made from the system controller 14 to the LCU 22. Then, the system controller 14 extracts, from that information, information representing whether the blur correction function of the interchangeable lens 2 is set to be effective or ineffective, and reports that information (lens blur correction information) to the blur correction microcomputer 15. The blur correction microcomputer 15 conducts the determination in S101 on the basis of that information.

Each time the setting of the blur correction function to be effective or ineffective is changed in the interchangeable lens 2, the information for the blur correction function is reported from the LCU 22 to the system controller 14. Then, information, extracted from that information, that indicates whether the blur correction of the interchangeable lens 2 is set to be effective or ineffective (lens blur correction information) is reported from the system controller 14 to the blur correction microcomputer 15.

When the determination result in S101 is No, the Roll correction range length calculation unit 156a of the correction range length calculation unit 156 of the blur correction microcomputer 15 determines the Roll correction range length to be θ1 (S102). Also in S102, the correction range length calculation unit 156 sets Roll correction range length θ1 in the Roll angle limit processing unit 1531c of the correction amount calculation unit 153 via the communication unit 155.

After S102, the Yaw/Pitch correction range length calculation unit 156b of the correction range length calculation unit 156 of the blur correction microcomputer 15 calculates the Yaw correction range length and the Pitch correction range length (S103) in accordance with Roll correction range length θ1 determined in S102. Also in S103, the correction range length calculation unit 156 sets the Yaw correction range length and the Pitch correction range length (Yaw/Pitch correction range length) in the Yaw angle limit processing unit 1531a and the Pitch angle limit processing unit 1531b of the correction amount calculation unit 153 via the communication unit 155.

When the determination result in S101 is Yes, the Roll correction range length calculation unit 156a of the correction range length calculation unit 156 of the blur correction microcomputer 15 determines the Roll correction range length to be θ2 (θ2>θ1) (S104). Also in S104, the correction range length calculation unit 156 sets that Roll correction range length θ2 in the Roll angle limit processing unit 1531c of the correction amount calculation unit 153 via the communication unit 155.

After S104, the Yaw/Pitch correction range length calculation unit 156b of the correction range length calculation unit 156 of the blur correction microcomputer 15 calculates the Yaw correction range length and the Pitch correction range length in accordance with Roll correction range length θ2 determined in S104 (S105). Also in S105, the correction range length calculation unit 156 sets the Yaw correction range length and the Pitch correction range length (Yaw/Pitch correction range length) in the Yaw angle limit processing unit 1531a and the Pitch angle limit processing unit 1531b of the correction amount calculation unit 153 via the communication unit 155.

In S102, S103, S104 and S105, the Roll correction range length is first determined and set, and the Yaw correction range length and the Pitch correction range length are later calculated and set. However, it is also possible to first determine and set a Yaw correction range length and a Pitch correction range length and to later calculate and set a Roll correction range length.

After S105, the blur correction microcomputer 15 sets the camera-body-side correction ratio reported from the system controller 14 (Yaw/Pitch correction ratio) in the Yaw angle shaking amount calculation unit 152a and the Pitch angle shaking amount calculation unit 152b (S106). Note that a camera-body-side correction ratio is calculated by the body-side correction ratio calculation unit 141a of the system controller 14.

After S106 or S103, the blur correction microcomputer 15 performs a shake detection process (S107). More specifically, the Yaw angle shaking amount calculation unit 152a, the Pitch angle shaking amount calculation unit 152b and the Roll angle shaking amount calculation unit 152c of the blur correction microcomputer 15 calculate the angle shaking amounts, respectively.

After S107, the blur correction microcomputer 15 performs a correction process (S108). More specifically, the correction amount calculation unit 153 of the blur correction microcomputer 15 calculates the driving amount of the image-sensor driving unit 13 on the basis of the respective shaking amounts calculated in S107, and the image-sensor driving unit 13 moves the image sensor 12 in accordance with the driving amount.

In the interchangeable lens 2, when a blur correction operation has started, the LCU 22 first sets, in the Yaw angle shaking amount calculation unit 222a and the Pitch angle shaking amount calculation unit 222b, an interchangeable-lens-side correction ratio (Yaw/Pitch correction ratio) reported by the system controller 14 (S201), as shown in FIG. 15. Note that the interchangeable-lens-side correction ratio is calculated by the lens-side correction ratio calculation unit 141b of the system controller 14.

After S201, the LCU 22 performs a shake detection process (S202). More specifically, the Yaw angle shaking amount calculation unit 222a and the Pitch angle shaking amount calculation unit 222b of the LCU 22 calculate the angle shaking amounts, respectively.

After S202, the LCU 22 performs a correction process (S203). More specifically, the correction amount calculation unit 223 of the LCU 22 calculates the driving amount of the optical system driving unit 23 on the basis of the respective angle shaking amounts calculated in S202, and the optical system driving unit 23 moves the blur correction lens in accordance with the driving amount.

Figure 16A:
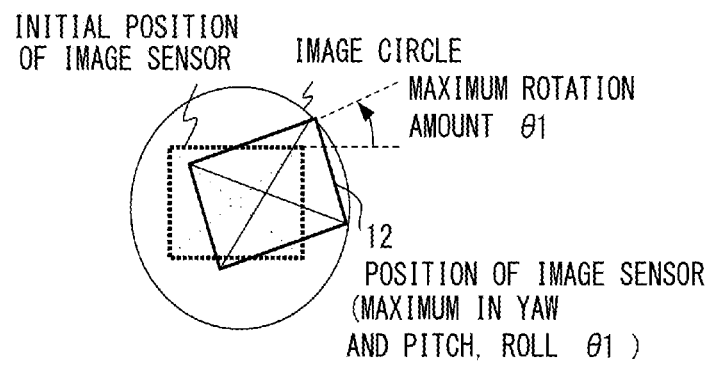
FIG. 16A is a first view showing an example of the position in a case when the image sensor has been rotated and translated maximally according to the first embodiment.

FIG. 16A and FIG. 16B show examples of positions in a case when the image sensor 12 has been rotated and translated maximally by the operations shown in FIG. 14. More specifically, FIG. 16A shows the position of the image sensor 12 in a case when the determination result in S101 shown in FIG. 14 is No and the image sensor 12 has been rotated maximally within the Roll correction range length (θ1 rotation) and has been translated maximally within the Yaw correction range length and the Pitch correction range length. FIG. 16B shows the position of the image sensor 12 in a case when the determination result in S101 in FIG. 14 is Yes and the image sensor 12 has been rotated maximally within the Roll correction range length (θ2 rotation) and has been translated maximally within the Yaw correction range length and the Pitch correction range length.

As shown in FIG. 16A and FIG. 16B, the maximum rotation amount of the image sensor 12 is greater when the determination result is yes in S101 shown in FIG. 14 (see FIG. 16B) than when that determination result is no (see FIG. 16A) (θ2>θ1). This is because the former case permits both the camera body 1 and the interchangeable lens 2 to perform the blur correction in the Yaw and Pitch directions, making the amounts of the blur correction in the Yaw and Pitch directions performed by the camera body 1 smaller than those in the latter case, in which the camera body 1 alone performs the correction in the Yaw and Pitch directions, and this makes it possible to correspondingly increase the amount of the blur correction in the Roll directions performed by the camera body 1.

As described above, in the camera system according to the present embodiment, the Roll correction range length is set to be longer in a case when the interchangeable lens 2 mounted on the camera body 1 can perform blur correction in the Yaw and Pitch directions than in other cases. Also, in this case, blur correction in the Yaw and Pitch directions is performed by both the camera body 1 and the interchangeable lens 2 in accordance with the camera-body-side correction ratio and the interchangeable-lens-side correction ratio. Accordingly, even when blur correction by the camera body 1 alone cannot fully correct the blur (for example when the shaking in the Roll directions, the Yaw directions and the Pitch directions is large), the blur correction performance can be improved.

FIG. 17 shows a relationship between maximum rotation amount θ1 and the maximum translation amount (which will be referred to by a1) of the image sensor 12 shown in FIG. 16A and maximum rotation amount θ2 and the maximum translation amount (which will be referred to by a2) of the image sensor 12 shown in FIG. 16B. It is assumed that the product of the interchangeable-lens correction range length and the correction sensitivity (L_l×K) is a1-a2 in the interchangeable lens 2.

The relationship between maximum rotation amounts θ2 and θ1 of the image sensor 12 satisfies θ2>θ1, whereas the relationship between maximum translation amounts a2 and a1 satisfies a2<a1 as shown in FIG. 17. However, because the product of the interchangeable-lens correction range length and the correction sensitivity (L_L×K) is a1-a2 in the interchangeable lens 2, the correction performance in the Yaw and Pitch directions is the same as that in the case where the camera body 1 alone performs the blur correction, leading to improved performance of correction in the Roll directions. Accordingly, blur correction can be performed appropriately even when for example a video is shot during walking or running or when a still image is shot with a long exposure time, etc., which will lead to larger shaking in the Roll directions.

Second Embodiment

The camera system according to the second embodiment of the present invention employs a method of determining a Roll correction range length that is different from the corresponding method employed by the camera system of the first embodiment. More specifically, the first embodiment determines a Roll correction range length regardless of the focal length of the optical system 21, whereas the second embodiment determines a Roll correction range length by changing the Roll correction range length in response to the focal length of the optical system 21.

Figure 18:
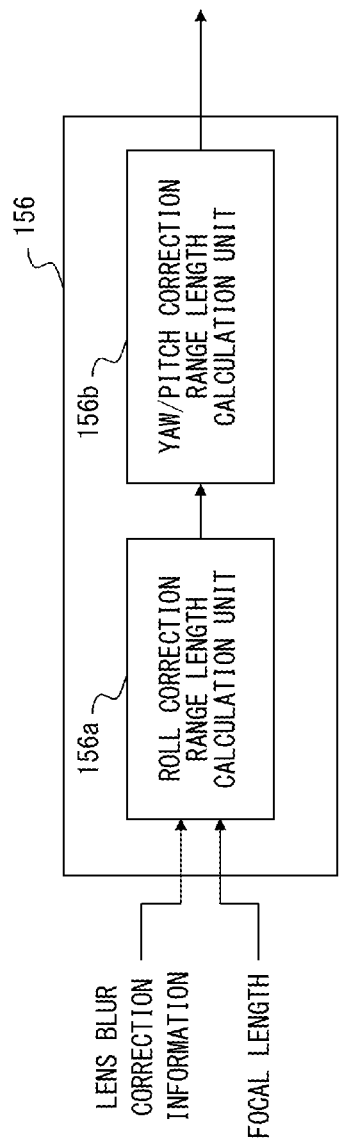
FIG. 18 shows a configuration example of a correction range length calculation unit according to a second embodiment.

FIG. 18 shows a configuration example of the correction range length calculation unit 156 according to the second embodiment.

As shown in FIG. 18, according to the second embodiment, in addition to the information about whether or not the interchangeable lens 2 mounted on the camera body 1 is an interchangeable lens that can perform blur correction in the Pitch and Yaw directions, the focal length of the optical system 21 is input to the Roll correction range length calculation unit 156a, which is a difference from the correction range length calculation unit 156 according to the first embodiment shown in FIG. 8.

In other words, the Roll correction range length calculation unit 156a according to the second embodiment determines a Roll correction range length in response to the focal length of the optical system 21 in accordance with whether or not the interchangeable lens 2 mounted on the camera body 1 is an interchangeable lens that can perform blur correction in the Pitch and Yaw directions. This means that a change in the focal length also changes the Roll correction range length. Note that the focal length of the optical system 21 is obtained from the LCU 22 via the contact point 3, the system controller 14 and the communication unit 155 at for example regular intervals.

The other configurations of the camera system of the second embodiment are similar to those of the camera system of the first embodiment, and the explanations thereof will be omitted.

Figure 19:
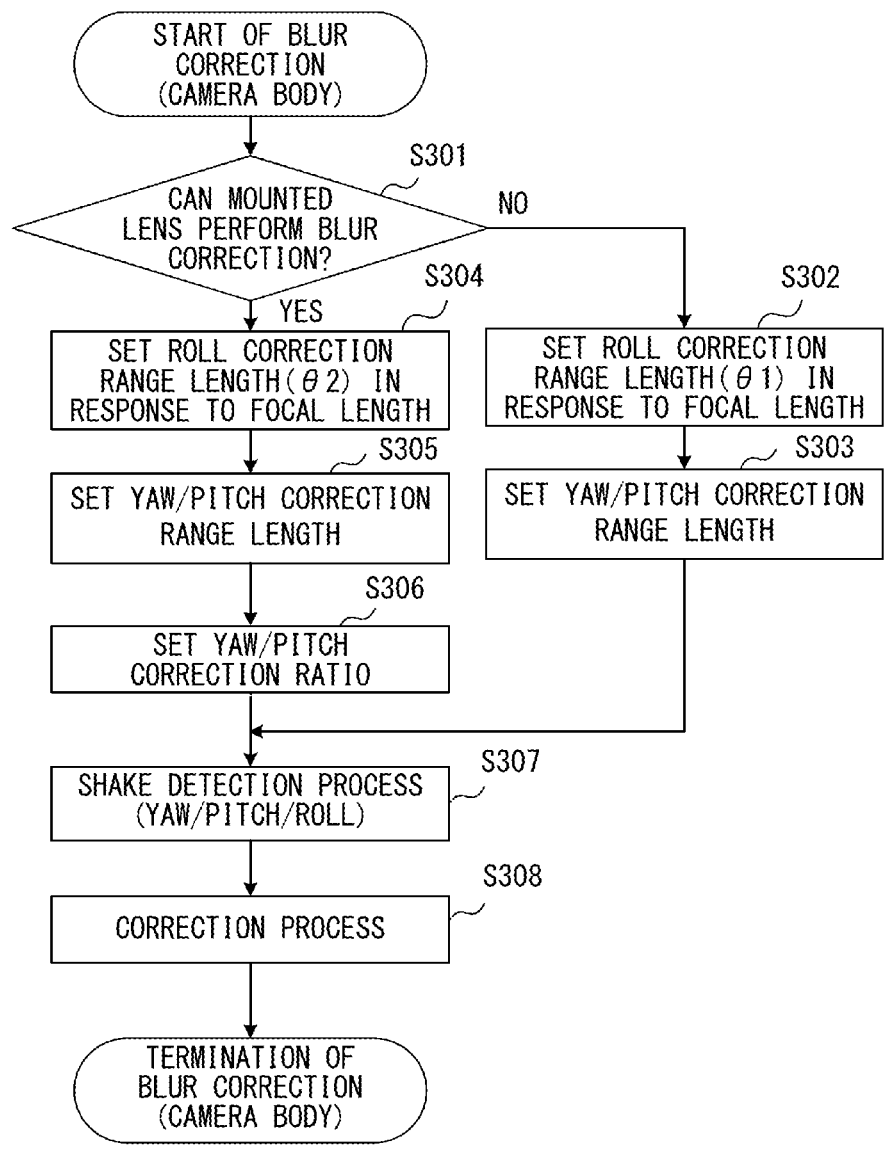
FIG. 19 is a flowchart showing an example of an operation performed by a blur correction microcomputer according to the second embodiment.

FIG. 19 is a flowchart showing an example of an operation performed by the blur correction microcomputer 15 of the camera body 1 in a blur correction operation performed by the camera system of the second embodiment.

The flowchart shown in FIG. 19 corresponds to the flowchart shown in FIG. 14, which was explained in the first embodiment, and S301, S303 and S305 through S308 shown in FIG. 19 are similar to S101, S103 and S105 through S108 shown in FIG. 14, and the explanations thereof will be omitted.

In FIG. 19, when the determination result in S301 is no, the Roll correction range length calculation unit 156a of the correction range length calculation unit 156 of the blur correction microcomputer 15 determines the Roll correction range length to be θ1, which is in response to the focal length (S302). Also, in that S302, the correction range length calculation unit 156 sets that Roll correction range length θ1 in the Roll angle limit processing unit 1531c of the correction amount calculation unit 153 via the communication unit 155.

When the determination result in S301 is yes, the Roll correction range length calculation unit 156a of the correction range length calculation unit 156 of the blur correction microcomputer 15 determines the Roll correction range length to be θ2 (θ2≥θ1), which is in response to the focal length (S304). Also in that S304, the correction range length calculation unit 156 sets that Roll correction range length θ2 in the Roll angle limit processing unit 1531c of the correction amount calculation unit 153 via the communication unit 155.

In a blur correction operation performed by the camera system of the second embodiment, the operation performed by the LCU 22 of the interchangeable lens 2, which can be performed in parallel to the operation performed by the blur correction microcomputer 15 of the camera body 1 shown in FIG. 19, is similar to that explained by the flowchart shown in FIG. 15 and described in the first embodiment, and the explanations thereof will be omitted.

Now, further explanations will be given for a Roll correction range length, a Yaw correction range length and a Pitch correction range length set by the operation explained in FIG. 19.

As a general rule, the image blur amounts due to the shake angles in the Yaw and Pitch directions regarding a subject that is at infinity are expressed by Equations (8) and (9) below.

$$b\_Yaw = f \times \tan \theta\_Yaw \qquad \text{equation(8)}$$

$$b\_Pitch = f \times \tan \theta\_Pitch \qquad \text{equation(9)}$$

In Equations (8) and (9) above, b_Yaw represents the image blur amount based on the shaking angle in the Yaw directions.

b_Pitch represents the image blur amount based on the shaking angle in the Pitch directions.

f represents the focal length of the optical system 21.

θ_Yaw represents the shaking angle in the Yaw directions.

θ_Pitch represents the shaking angle in the Pitch directions.

As is obvious from Equations (8) and (9) above, in each of the Yaw directions and the Pitch directions, an increase in the focal length increases the amount of the image blur even when the shaking angle remains the same, and accordingly the Yaw correction range length and the Pitch correction range length have to be made longer when the focal length is long.

Representative moving image shooting scenes that use cameras include shooting during walking, handheld shooting, etc.

For example, shooting during walking is often performed with a focal length that is relatively short, making image blur due to shaking in the Roll directions likely to be greater than image blur due to shaking in the Yaw and Pitch directions. This is because, as is obvious from Equations (8) and (9) above, a short focal length does not increase image blur due to shaking in the Yaw and Pitch directions.

Figure 20:
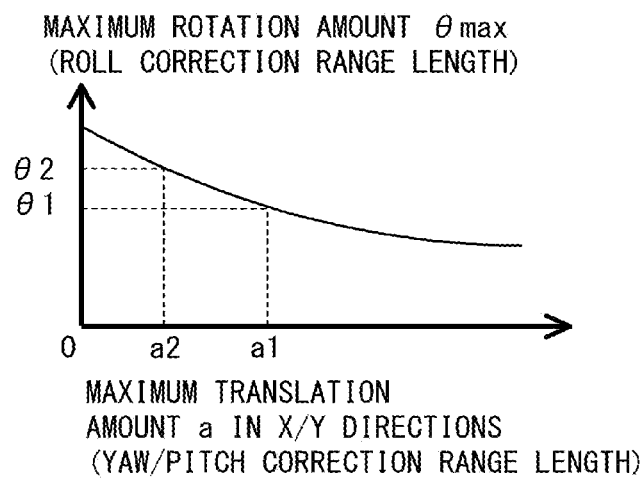
FIG. 20 shows an example of a relationship between Roll correction range length θ1 set in S302 shown in FIG. 19 and the Yaw and Pitch correction range lengths (both will be referred to as a1) set in S303 shown in FIG. 19 and also shows an example of a relationship between Roll correction range length θ2 set in S304 shown in FIG. 19 and the Yaw and Pitch correction range lengths (both will be referred to as a2) set in S305 shown in FIG. 19 in a case when the focal length is short (wide angle shooting)

FIG. 20 shows an example of a relationship between Roll correction range length θ1 set in S302 shown in FIG. 19 and the Yaw and Pitch correction range lengths (both will be referred to as a1) set in S303 shown in FIG. 19, and also shows an example of a relationship between Roll correction range length θ2 set in S304 shown in FIG. 19 and the Yaw and Pitch correction range lengths (both will be referred to as a2) set in S305 shown in FIG. 19 in a case when the focal length is short (wide angle shooting). It is assumed that the product of the interchangeable-lens correction range length and the correction sensitivity (L_l×K) is a1-a2 in the interchangeable lens 2.

As shown in FIG. 20, when the focal length is short, a shooting scene with a large amount of shaking in the Roll directions such as shooting during walking etc. is assumed. In such a case, by making θ2 greater than θ1 (θ2>θ1), and performing blur correction by the interchangeable lens 2 so as to correct a2, which has been made relatively smaller thereby, the performance of correction of blur in the Roll directions can be made better than a case where the blur correction is performed by the camera body 1 alone.

Also, handheld shooting while standing still for example results in a smaller amount of shaking in the Roll directions than in shooting during walking, whereas handled shooting with a long focal length results in greater image blur due to shaking in the Yaw and Pitch directions. This is because, as is obvious from Equations (8) and (9), a long focal length makes image blur due to shaking in the Yaw and Pitch directions greater.

FIG. 21 shows an example of a relationship between Roll correction range length θ1 set in S302 shown in FIG. 19 and the Yaw and Pitch correction range lengths (both will be referred to as a1) set in S303 shown in FIG. 19 and also shows an example of a relationship between Roll correction range length θ2 set in S304 shown in FIG. 19 and the Yaw and Pitch correction range lengths (both will be referred to as a2) set in S305 shown in FIG. 19 in a case when the focal length is long (telescopic shooting).

As shown in FIG. 21, when the focal length is long, a shooting scene without a large amount of shaking in the Roll directions such as shooting while standing still etc. is assumed. In such a case, by making θ2 equal to θ1 (θ2=θ1 (a1=a2)) and performing blur correction by using the interchangeable lens 2 in parallel, the performance of correction of blur in the Yaw and Pitch directions can be made better than a case where the blur correction is performed by the camera body 1 alone.

Figure 22B:
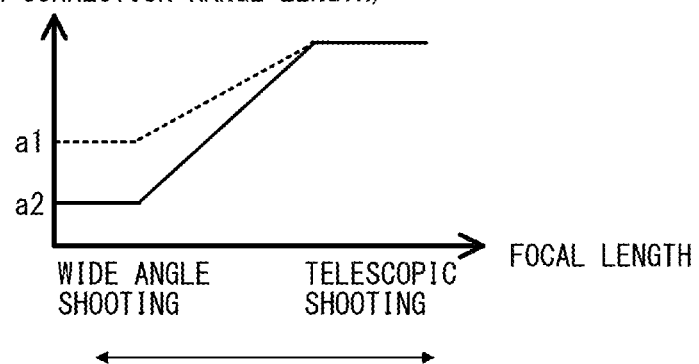
FIG. 22B shows an example of a relationship between the focal length and a1 and a2 shown in FIG. 20 and FIG. 21.

FIG. 22A shows an example of a relationship between the focal length and θ1 and θ2 shown in FIG. 20 and FIG. 21. FIG. 22B shows an example of a relationship between the focal length and a1 and a2 shown in FIG. 20 and FIG. 21.

As shown in FIG. 22A and FIG. 22B, when the focal length is short (wide angle shooting), the Roll correction range length is set to be a large value and the Yaw and Pitch correction range lengths are set to be small values. When the focal length is long (telescopic shooting), the Roll correction range length is set to be a small value and the Yaw and Pitch correction range lengths are set to be large values.

As described above, in the camera system according to the second embodiment, the Roll correction range length changes in accordance with the focal length. For wide angle shooting for example, a shooting scene with a large amount of shaking in the Roll directions such as shooting during walking etc. is assumed, and accordingly the Roll correction range length is set so that θ2>θ1 is satisfied, as explained by referring to FIG. 20. For telescopic shooting for example, a shooting scene not involving a large amount of shaking in the Roll directions such as handheld shooting while standing still etc. is assumed, and accordingly the Roll correction range length is set so that θ2=θ1 is satisfied, as explained by referring to FIG. 21. This makes it possible to set the Roll correction range length that is appropriate for the focal length. Further, Yaw and Pitch correction range lengths are calculated in accordance with that Roll correction range length, making it possible to use the correction range effectively, which results in the improvement of the correction performance.

Third Embodiment

The camera system according to the third embodiment of the present invention employs a method of determining a Roll correction range length that is different from the corresponding method employed by the camera system of the first embodiment. More specifically, the first embodiment determined a Roll correction range length regardless of whether or not the interchangeable lens 2 mounted on the camera body 1 can perform blur correction in the Pitch and Yaw directions. By contrast, the third embodiment determines a Roll correction range length on the basis of whether the interchangeable lens 2 mounted on the camera body 1 can perform blur correction in the Pitch and Yaw directions and on the basis of whether or not the shaking in the Roll directions is large.

Figure 23:
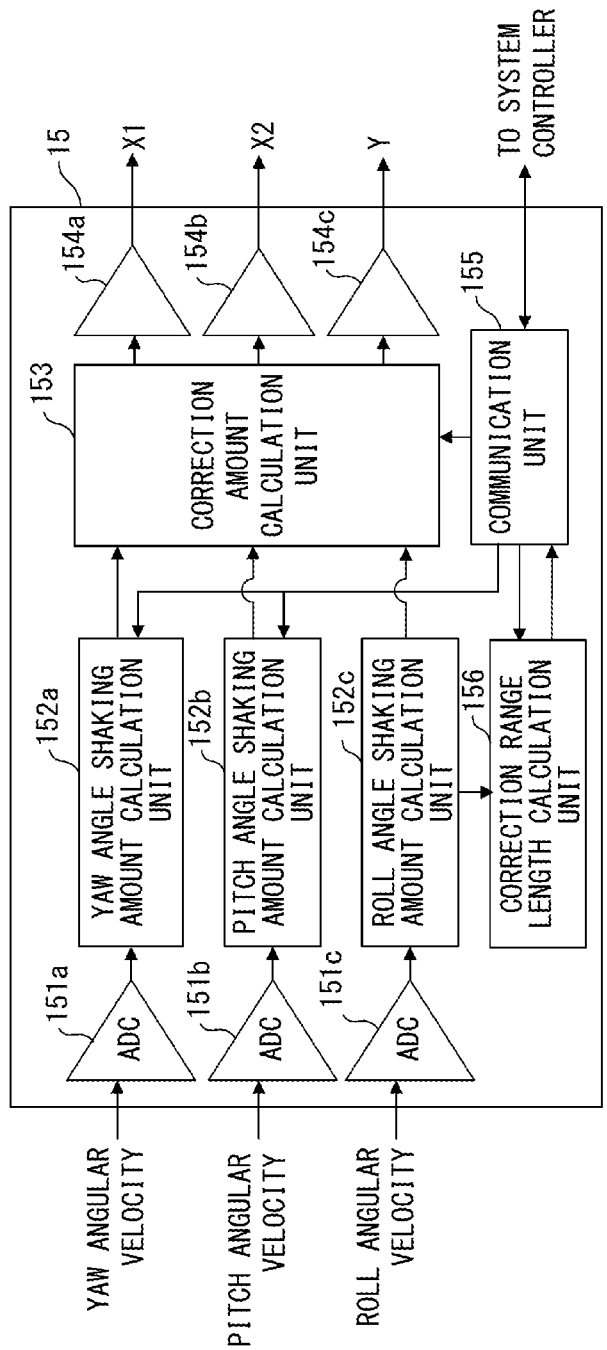
FIG. 23 shows a configuration example of a blur correction microcomputer according to a third embodiment.

FIG. 23 shows a configuration example of the blur correction microcomputer 15 according to the third embodiment.

As shown in FIG. 23, the Roll angle shaking amount calculation unit 152c of the third embodiment further determines whether or not shaking in the Roll directions is large and outputs a determination signal representing the result of the determination to the correction range length calculation unit 156, as will be explained in detail by referring to FIG. 24. As will be explained in detail by referring to FIG. 26, the correction range length calculation unit 156 then determines the Roll correction range length in accordance with whether or not the interchangeable lens 2 mounted on the camera body 1 can perform blur correction in the Pitch and Yaw directions (lens blur correction information) and on the basis of the determination result in response to the determination signal output from the Roll angle shaking amount calculation unit 152c.

FIG. 24 shows a configuration example of the Roll angle shaking amount calculation unit 152c according to the third embodiment.

As shown in FIG. 24, the Roll angle shaking amount calculation unit 152c of the third embodiment further includes a determination unit 1525. The determination unit 1525 determines whether or not shaking in the Roll directions is large on the basis of output from the ADC 151c, and outputs a determination signal representing the result of the determination.

The determination unit 1525 makes the above determination in for example the following manner.

First, it is detected in a sequential manner whether or not the angular velocity in the Roll directions (output of the ADC 151c) exceeds one of the positive side threshold and the negative side threshold. Then, a condition wherein a period of time between when the angular velocity in the Roll directions exceeded one of the positive and negative side thresholds and when it thereafter exceeded the other of the thresholds is shorter than a threshold period is treated as condition 1. Also, a condition wherein a period of time between when the angular velocity in the Roll directions exceeded one of the positive and negative side thresholds and when a threshold period has elapsed thereafter without condition 1 being met is treated as condition 2.

Thereafter, the determination of whether or not shaking in the Roll directions is large is started at the time of day when the angular velocity in the Roll directions met condition 1. When condition 1 is met again without condition 2 being fulfilled after the start of the determination, shaking in the Roll directions is determined to be large. When condition 2 is met after the start of the determination, shaking in the Roll directions is determined to be small. Then, the determination unit 1525 outputs, to the correction range length calculation unit 156, a determination signal representing the determination result, which indicates whether the shaking in the Roll directions is large or small.

Explanations will be given for a specific example of the above determination, by using FIG. 25.

Figure 25:
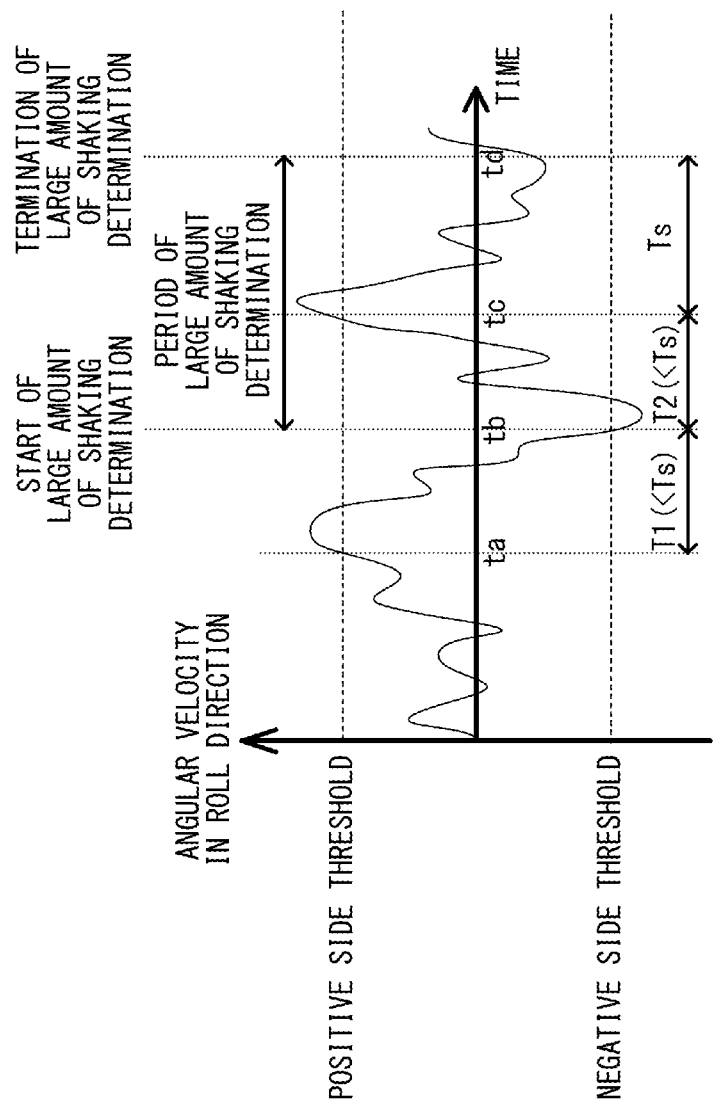
FIG. 25 shows an example of a transition of time of the angular velocity in the Roll directions according to the third embodiment.

FIG. 25 shows an example of a transition of time of the angular velocity in the Roll directions (output of the ADC 151c).

In the example shown in FIG. 25, the angular velocity in the Roll directions exceeds the positive side threshold at time of day ta, and thereafter exceeds negative side threshold at time of day tb. In this situation, time T1, which is between time of day ta and time of day tb, is shorter than threshold time Ts. Accordingly, it is determined that condition 1 is met and the shaking in the Roll directions is large at time of day tb (start of large amount of shaking determination).

Thereafter, the angular velocity in the Roll directions again exceeds the positive side threshold at time of day tc. Time T2, which is between time of day tb and time of day tc, is shorter than threshold time Ts. Because condition 1 is met without condition 2 being fulfilled after the start of the determination, shaking in the Roll directions is determined to be large. Then, the determination unit 1525 continuously outputs, to the correction range length calculation unit 156, a determination signal representing the determination result indicating that shaking in the Roll directions is large.

Thereafter, the angular velocity in the Roll directions does not exceed the negative side threshold until time of day td, which is the moment at which threshold time Ts has expired. Accordingly, in response to the fulfillment of condition 2, the determination is terminated at time of day td (termination of large amount of shaking determination). Then, the determination unit 1525 outputs, to the correction range length calculation unit 156, a determination signal representing the determination result indicating that shaking in the Roll directions is small.

In the example shown in FIG. 25, the period between time of day tb and time of day td is the period in which shaking in the Roll directions is determined to be large (large amount of shaking determination period).

Note that methods of determining whether or not shaking in the Roll directions is large are not limited to the above example, and it is also possible for example to determine that shaking in the Roll directions is large when condition 1 has been met at least two consecutive times.

Figure 26:
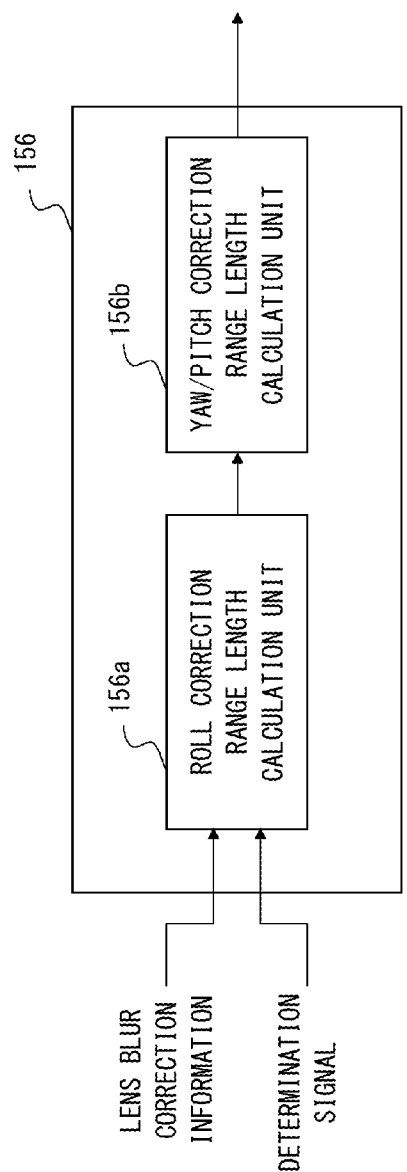
FIG. 26 shows a configuration example of a correction range length calculation unit according to the third embodiment.

FIG. 26 shows a configuration example of the correction range length calculation unit 156 according to the third embodiment.

As shown in FIG. 26, in the third embodiment, the Roll correction range length calculation unit 156a determines a Roll correction range length on the basis of whether or not the interchangeable lens 2 mounted on the camera body 1 is an interchangeable lens that can correct shaking in the Pitch and Yaw directions (lens blur correction information) and a determination signal output from the Roll angle shaking amount calculation unit 152c.

The other configurations of the camera system of the third embodiment are similar to those of the camera system of the first embodiment, and the explanations thereof will be omitted.

Note that in the camera system of the third embodiment having the above configuration, the Roll angular velocity sensor 16c of the camera body 1 is an example of a shake detection unit that detects shaking in the Roll directions. The determination unit 1525 of the Roll angle shaking amount calculation unit 152c of the blur correction microcomputer 15 of the camera body 1 is an example of a shake determination unit that determines whether or not shaking in the Roll directions is large on the basis of a result of detection by the shake detection unit for detecting shaking in the Roll directions.

FIG. 27 is a flowchart explaining an example of an operation of the blur correction microcomputer 15 of the camera body 1 in a blur correction operation conducted in the camera system of the third embodiment.

The flowchart shown in FIG. 27 corresponds to the flowchart shown in FIG. 14 explained in the first embodiment, S403 through S409 shown in FIG. 27 are similar to S102 through S108 shown in FIG. 14, and accordingly the explanations thereof will be omitted.

As shown in FIG. 27 when a blur correction operation has started in the camera body 1, the determination unit 1525 of the Roll angle shaking amount calculation unit 152c of the blur correction microcomputer 15 determines whether or not shaking in the Roll directions is large (S401).

After S401, the blur correction microcomputer 15 determine whether or not the interchangeable lens 2 mounted on the camera body 1 can perform blur correction in the Yaw and Pitch directions and the determination result in S401 indicates that shaking in the Roll directions is large (S402).

When the determination relationship in S402 is No, the process proceeds to S403 and when that determination result is Yes, the process proceeds to S405.

In a blur correction operation performed by the camera system of the third embodiment, the operation performed by the LCU 22 of the interchangeable lens 2, which can be performed in parallel to the operation performed by the blur correction microcomputer 15 of the camera body 1 shown in FIG. 27, is similar to that explained by the flowchart shown in FIG. 15 and described in the first embodiment, and the explanations thereof will be omitted.

As described above, in the camera system according to the third embodiment, when the interchangeable lens mounted on the camera body 1 can perform blur correction in the Yaw and Pitch directions and shaking in the Roll directions is large, a long Roll correction range length is set. Also, in this case, blur correction in the Yaw and Pitch directions is performed by both the camera body 1 and the interchangeable lens 2 in accordance with the camera-body-side correction ratio and the interchangeable-lens-side correction ratio. This can improve the blur correction performance for a shooting scene with a large amount of shaking in the Roll directions, such as shooting during walking etc.

The present invention is not limited to the above embodiments, and can be embodied with modified constituents without departing from the spirit of the invention in the implementation. Also, an appropriate combination of a plurality of constituents disclosed in the above embodiments can form various inventions. For example, some of the constituents described in the embodiments can be omitted. Further, the constituents can appropriately be combined across different embodiments.

As described above, according to the present invention, when blur correction is performed by both an interchangeable lens and the camera body, the blur correction range can be expanded by effectively using the blur correction ranges of both of them, resulting in the effect of improving the blur correction performance.

What is claimed is:

1. A camera system comprising an interchangeable lens and a camera body to and from which the interchangeable lens is attachable and detachable, wherein
    the camera body includes a microcomputer and a system controller;
    the microcomputer:
        performs blur correction in a plurality of rotation directions including Roll directions, which are directions of rotation on an optical axis of the interchangeable lens mounted on the camera body, Pitch directions, which are directions of rotation on an axis perpendicular to the optical axis, and Yaw directions, which are directions of rotation on an axis perpendicular to both the optical axis and the axis perpendicular to the optical axis;
        determines whether or not the interchangeable lens mounted on the camera body can perform blur correction in the Pitch directions and blur correction in the Yaw directions;
        sets a blur correction range in the Roll directions to be a first blur correction range for performing blur correction in the Roll directions when it is determined that the interchangeable lens mounted on the camera body cannot perform blur correction in the Pitch directions and blur correction in the Yaw directions or that sets a blur correction range in the Roll directions to be a second blur correction range, which is equal to or longer than the first blur correction range, for performing blur correction in the Roll directions when it is determined that the interchangeable lens mounted on the camera body can perform blur correction in the Pitch directions and blur correction in the Yaw directions; and
        sets blur correction ranges in the Pitch and Yaw directions for performing blur correction in the Pitch directions and blur correction in the Yaw directions, on the basis of the first or second blur correction range;
    the system controller:
        calculates a camera-body-side blur correction ratio and an interchangeable-lens-side blur correction ratio for both the camera body and the interchangeable lens performing blur correction in the Pitch directions and blur correction in the Yaw directions when it is determined that the interchangeable lens mounted on the camera body can perform the blur correction in the Pitch directions and blur correction in the Yaw directions,
    the microcomputer further:
        performs blur correction in the Roll directions within the second blur correction range when it is determined that the interchangeable lens mounted on the camera body can perform blur correction in the Pitch directions and blur correction in the Yaw directions, and
        performs blur correction in the Pitch directions and blur correction in the Yaw directions within the set blur correction ranges in the Pitch and Yaw directions on the basis of the second blur correction range in accordance with the camera-body-side blur correction ratio, and
    the interchangeable lens:
        performs blur correction in the Pitch directions and blur correction in the Yaw directions in accordance with the calculated interchangeable-lens-side blur correction ratio.

2. The camera system according to claim 1, wherein the system controller calculates the camera-body-side blur correction ratio and the interchangeable-lens-side blur correction ratio on the basis of:
    a maximum blur correction range over which the microcomputer can perform blur correction in the Pitch directions and blur correction in the Yaw directions, and
    a maximum blur correction range over which the interchangeable lens can perform blur correction in the Pitch directions and blur correction in the Yaw directions.

3. The camera system according to claim 1, wherein the microcomputer:
    performs blur correction in the Roll directions within the first blur correction range when it is determined that the interchangeable lens mounted on the camera body cannot perform blur correction in the Pitch directions and blur correction in the Yaw directions, and
    performs blur correction in the Pitch directions and blur correction in the Yaw directions within the set blur correction ranges in the Pitch and Yaw directions on the basis of the first blur correction range.

4. The camera system according to claim 1, wherein the microcomputer sets the first blur correction range or the second blur correction range by varying the first blur correction range or the second blur correction range on the basis of focal length information of the interchangeable lens included in optical information of the interchangeable lens obtained from the interchangeable lens.

5. The camera system according to claim 1, wherein the camera body further includes:
    a shake detector that detects shaking in the Roll directions, and the microcomputer further:
determines whether or not shaking in the Roll directions is large on the basis of a detection result of the shake detector, and
sets a blur correction range in the Roll directions for performing blur correction in the Roll directions to be the first blur correction range when it is determined that the interchangeable lens mounted on the camera body cannot perform blur correction in the Pitch directions and blur correction in the Yaw directions or when it is determined that shaking in the Roll directions is not large, or
sets the blur correction range in the Roll directions for performing blur correction in the Roll directions to be the second blur correction range when it is determined that the interchangeable lens mounted on the camera body can perform blur correction in the Pitch directions and blur correction in the Yaw directions and when it is determined that shaking in the Roll directions is large.

6. A blur correction method for a camera system including an interchangeable lens and a camera body to and from which the interchangeable lens is attachable and detachable, wherein the camera body includes a microcomputer that performs blur correction in a plurality of rotation directions including Roll directions, which are directions of rotation on an optical axis of the interchangeable lens mounted on the camera body, Pitch directions, which are directions of rotation on an axis perpendicular to the optical axis, and Yaw directions, which are directions of rotation on an axis perpendicular to both the optical axis and the axis perpendicular to the optical axis, the blur correction method comprising:

determining whether or not the interchangeable lens mounted on the camera body can perform blur correction in the Pitch directions and blur correction in the Yaw directions;

setting a blur correction range in the Roll directions to be a first blur correction range for performing blur correction in the Roll directions when it is determined that the interchangeable lens mounted on the camera body cannot perform blur correction in the Pitch directions and blur correction in the Yaw directions or setting a blur correction range in the Roll directions to be a second blur correction range, which is equal to or longer than the first blur correction range, for performing blur correction in the Roll directions when it is determined that the interchangeable lens mounted on the camera body can perform blur correction in the Pitch directions and blur correction in the Yaw directions;

setting blur correction ranges in the Pitch and Yaw directions for performing blur correction in the Pitch directions and blur correction in the Yaw directions, on the basis of the first or second blur correction range;

calculating a camera-body-side blur correction ratio and a interchangeable-lens-side blur correction ratio for both the camera body and the interchangeable lens performing blur correction in the Pitch directions and blur correction in the Yaw directions when it is determined that the interchangeable lens mounted on the camera body can perform blur correction in the Pitch directions and blur correction in the Yaw directions; and performing blur correction in the Roll directions within the second blur correction range and perform blur correction in the Pitch directions and blur correction in the Yaw directions within the blur correction ranges in the Pitch and Yaw directions set on the basis of the second blur correction range in accordance with the camera-body-side blur correction ratio when it is determined that the interchangeable lens mounted on the camera body can perform blur correction in the Pitch directions and blur correction in the Yaw directions, and making the interchangeable lens perform blur correction in the Pitch directions and blur correction in the Yaw directions in accordance with the interchangeable-lens-side blur correction ratio.

7. A camera body to and from which an interchangeable lens is attachable and detachable, comprising:
a microcomputer; and
a system controller, wherein
the microcomputer:
performs blur correction in a plurality of rotation directions including Roll directions, which are directions of rotation on an optical axis of the interchangeable lens mounted on the camera body, Pitch directions, which are directions of rotation on an axis perpendicular to the optical axis, and Yaw directions, which are directions of rotation on an axis perpendicular to both the optical axis and the axis perpendicular to the optical axis;
determines whether or not the interchangeable lens mounted on the camera body can perform blur correction in the Pitch directions and blur correction in the Yaw directions;
sets a blur correction range in the Roll directions to be a first blur correction range for performing blur correction in the Roll directions when it is determined that the interchangeable lens mounted on the camera body cannot perform blur correction in the Pitch directions and blur correction in the Yaw directions or that sets a blur correction range in the Roll directions to be a second blur correction range, which is equal to or longer than the first blur correction range, for performing blur correction in the Roll directions when it is determined that the interchangeable lens mounted on the camera body can perform blur correction in the Pitch directions and blur correction in the Yaw directions; and
sets blur correction ranges in the Pitch and Yaw directions for performing blur correction in the Pitch directions and blur correction in the Yaw directions, on the basis of the first or second blur correction range;
the system controller:
calculates a camera-body-side blur correction ratio and an interchangeable-lens-side blur correction ratio for both the camera body and the interchangeable lens performing blur correction in the Pitch directions and blur correction in the Yaw directions when it is determined that the interchangeable lens mounted on the camera body can perform the blur correction in the Pitch directions and blur correction in the Yaw directions, and
the microcomputer further:
performs blur correction in the Roll directions within the second blur correction range when it is determined that the interchangeable lens mounted on the camera body can perform blur correction in the Pitch directions and blur correction in the Yaw directions, and
performs blur correction in the Pitch directions and blur correction in the Yaw directions within the set blur correction ranges in the Pitch and Yaw directions on the basis of the second blur correction range in accordance with the camera-body-side blur correction ratio.

\* \* \* \* \*